US012257126B2

(12) United States Patent
Connell et al.

(10) Patent No.: US 12,257,126 B2
(45) Date of Patent: Mar. 25, 2025

(54) DENTAL IMPLANT

(71) Applicant: BioClean Dental, LLC, Jupiter, FL (US)

(72) Inventors: William Edward Connell, Jupiter, FL (US); David Eleario Federici, Toms River, NJ (US); Christopher Gervais, Rancho Santa Fe, CA (US)

(73) Assignee: BIOCLEAN DENTAL, LLC, Jupiter, FL (US)

( * ) Notice: Subject to any disclaimer, the term of this patent is extended or adjusted under 35 U.S.C. 154(b) by 0 days.

(21) Appl. No.: 17/463,723

(22) Filed: Sep. 1, 2021

(65) Prior Publication Data

US 2021/0393377 A1     Dec. 23, 2021

Related U.S. Application Data

(63) Continuation-in-part of application No. 16/930,443, filed on Jul. 16, 2020.

(60) Provisional application No. 62/897,354, filed on Sep. 8, 2019.

(51) Int. Cl.
*A61C 8/00*     (2006.01)

(52) U.S. Cl.
CPC ............ *A61C 8/001* (2013.01); *A61C 8/0053* (2013.01); *A61C 8/0059* (2013.01); *A61C 8/0063* (2013.01); *A61C 8/0068* (2013.01)

(58) Field of Classification Search
CPC ..... A61C 13/225; A61C 13/26; A61C 13/265; A61C 13/2653; A61C 13/2656; A61C 13/267; A61C 8/0095; A61C 8/0057; A61C 8/0062; A61C 8/0065
See application file for complete search history.

(56) References Cited

U.S. PATENT DOCUMENTS

| 5,116,225 A | 5/1992 | Riera |
| 5,195,891 A | 3/1993 | Sulc |

(Continued)

FOREIGN PATENT DOCUMENTS

| CN | 109330723 A | * 2/2019 | ............... A61C 8/00 |
| EP | 3357450 | 8/2018 | |

(Continued)

OTHER PUBLICATIONS

Anonymous, "A removable prosthesis with the comfort of a fixed restoration", Internet article, https://bing.com/search?q=a+removable+prosthesis+with+the+comfort+of+a+fixed+restoration&form=ANNHO1&refig=b1522820a7984afd8582fd62ebb6502e, (Feb. 16, 2015).

*Primary Examiner* — Cris L. Rodriguez
*Assistant Examiner* — Luis Ruiz Martin
(74) *Attorney, Agent, or Firm* — McHale & Slavin, P.A.

(57) ABSTRACT

A multi-component dental implant system designed to improve oral hygiene. The dental implant system may comprise an implant body configured to be insertable into at least a portion of an individual's mouth, a primary or first abutment, a dental prosthesis engagement member, and a housing assembly. In use, the first abutment is designed to engage with and secure to the dental prosthesis engagement member. The housing is configured to secure to or cover the dental prosthesis engagement member. The dental implant system allows an individual to remove a prosthesis without the aid of any special tools or instruments.

13 Claims, 47 Drawing Sheets

(56) References Cited

U.S. PATENT DOCUMENTS

| | | | |
|---|---|---|---|
| 5,417,570 A * | 5/1995 | Zuest | A61C 13/2656 |
| | | | 433/172 |
| 9,204,943 B1 * | 12/2015 | Zadeh | A61K 6/20 |
| 9,301,818 B2 | 4/2016 | Benz et al. | |
| 9,456,881 B1 | 10/2016 | Niznick | |
| 10,136,967 B2 | 11/2018 | Morgan et al. | |
| 10,258,435 B2 | 4/2019 | Seo et al. | |
| 10,383,710 B2 | 8/2019 | Collins | |
| 10,588,721 B2 | 3/2020 | Robichaud et al. | |
| 2002/0177103 A1 | 11/2002 | Pelak | |
| 2009/0298013 A1 | 12/2009 | Baruc | |
| 2012/0322030 A1 * | 12/2012 | Fromovich | A61C 8/0089 |
| | | | 433/173 |
| 2015/0335401 A1 * | 11/2015 | Robichaud | A61C 8/0063 |
| | | | 433/201.1 |
| 2017/0056134 A1 | 3/2017 | Cordonnier | |
| 2019/0223987 A1 | 7/2019 | Doswell et al. | |
| 2020/0253699 A1 * | 8/2020 | Dahiya | A61C 8/0069 |

FOREIGN PATENT DOCUMENTS

| | | | |
|---|---|---|---|
| KR | 20120003628 A * | 1/2012 | |
| KR | 101669612 B1 * | 11/2016 | |
| WO | WO2019078818 | 4/2019 | |
| WO | WO2019155343 | 8/2019 | |
| WO | WO2019158574 | 8/2019 | |

* cited by examiner

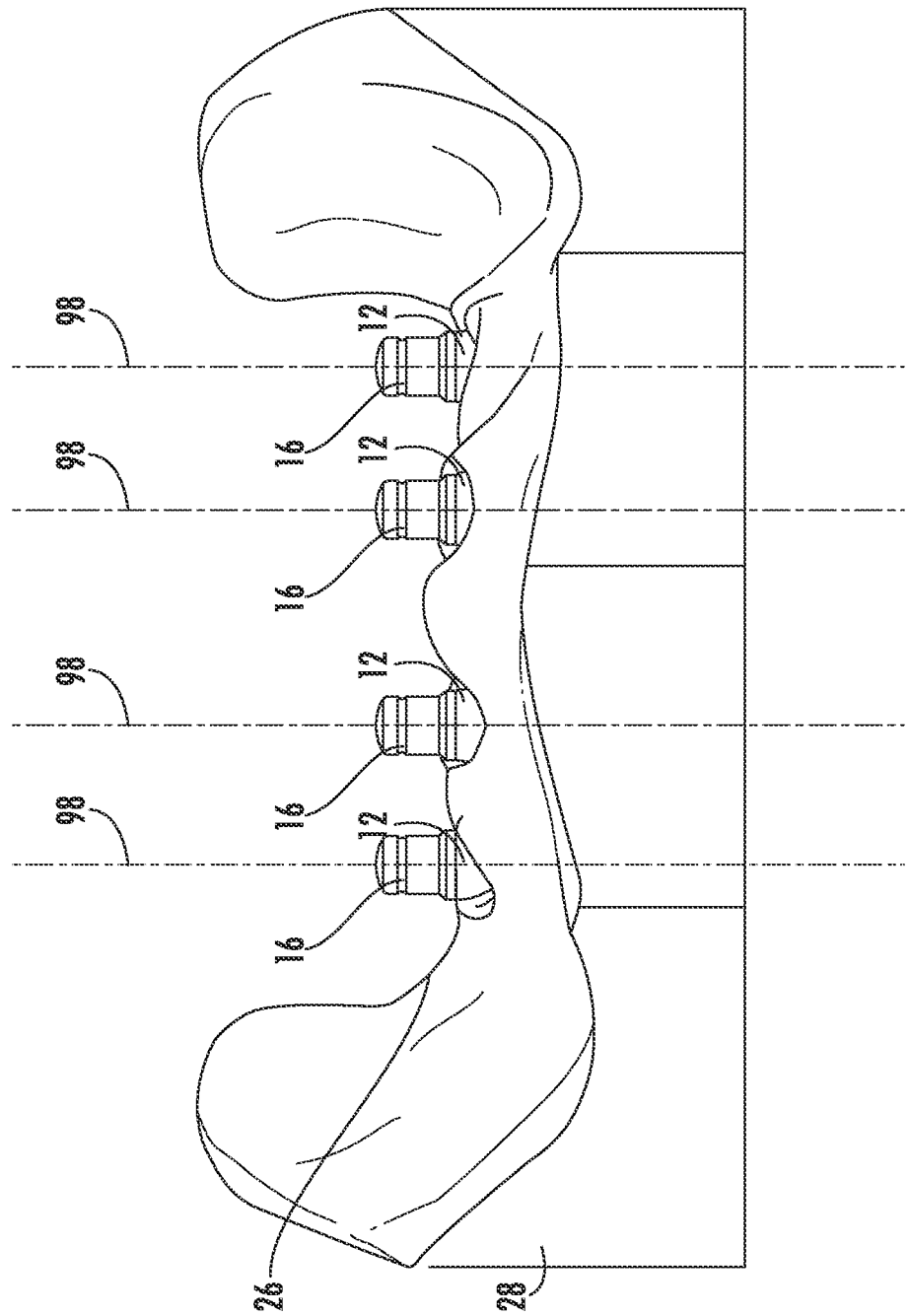

DENTAL IMPLANT

CROSS REFERENCE TO RELATED APPLICATIONS

In accordance with 37 C.F.R. 1.76, a claim of priority is included in an Application Data Sheet filed concurrently herewith. Accordingly, the present invention is a continuation in part application of U.S. patent application Ser. No. 16/930,443, entitled "DENTAL IMPLANT", filed Jul. 16, 2020, which claims priority to U.S. Provisional Patent Application No. 62/897,354, entitled "Perfect Parallel Implant Component", filed Sep. 8, 2019. The contents of the above referenced applications are incorporated herein by reference in their entirety.

FIELD OF THE INVENTION

The present invention relates to medical implants; to dental implants, devices and systems; and more particularly, to a multi-component dental implant system designed to be easily removed without the use of special removal tools, and methods of implanting dental implants.

BACKGROUND OF THE INVENTION

Dental implants are well known in the dental field. For example, U.S. Pat. Nos. 10,588,721, 10,258,435, and U.S Patent Application Publication No. 2015/0335401 are illustrative examples of dental implant systems. U.S. Pat. No. 10,588,721 is described as disclosing attachment systems for attaching removable dental prostheses to dental implants. U.S. Pat. No. 10,258,435 is described as disclosing an apparatus and method for adjustably retaining an oral appliance to an abutment assembly. In one variation, a securement apparatus is described to comprise a sleeve having a sleeve frame and a number of locking flaps. U.S. Patent Application Publication No. 2015/0335401 is described as providing a dental prosthesis attachment system for an endosseous dental implant. The dental prosthesis attachment system is described to include a removable dental prosthesis; a dental prosthesis portion secured to the removable dental prosthesis; and a dental implant portion securable to the dental implant and removably engageable with the dental prosthesis portion.

However, patients with many of these types of dental implants have difficulty maintaining proper oral hygiene. Many people who have implants with a fixed-detachable restoration are unable to properly clean around the implants on their own because the restoration is screw retained. As a result of this construction, the cleaning process requires a dental professional to remove the hardware. Such a process is time consuming for the dentist, and inconvenient for the patient. There is a need for an improved cleaning protocol of the implants and surrounding tissues for those individual patients wearing the dental fixed-detachable restorations or the dental practitioner whom they visit for cleaning and care appointments. The present invention addresses such need by providing a dental implant system in which one or more components implanted in the patient's mouth are easily accessible for proper cleaning and maintaining oral hygiene health.

SUMMARY OF THE INVENTION

The present invention relates to a multi-component dental implant system (which may also be termed a dental implant restorative system) designed to be easily removed without the use of special removal tools, and methods of implanting dental implants. The dental implant system is further designed to allow patients to better maintain oral hygiene, with the ability to remove one or more of the multiple components that make up the dental implant system. Easy removal of one or more components of the multi-component dental implant system will also allow the patient to remove their dental prosthesis with their own hands and place in a denture cleaner or simply scrub with a tooth brush. Patients using the multi-component dental implant system will have full access to brush and floss around the implants in the mouth, thus enabling the patient to maintain the health of the surrounding tissues and prevent bone loss.

The multi-component dental implant system also provides restorative components that are maintained in a parallel alignment. Providing an implant system designed to create parallelism with respect to neighboring or adjacent implant components within the same dental arch provides a system that requires less restorative space and allows the prosthesis to be inserted/removed in a single plane while possessing optimum retentive values to retain the removable prosthesis as compared to other systems. The multi-component dental implant system provides for corrective angling of the primary and/or the secondary structures with respect to adjacent and neighboring primary and/or secondary structures in the same dental arch.

Accordingly, it is an objective of the invention to provide a multi-component dental implant system.

It is an objective of the invention to provide a multi-component dental implant system designed to improve oral hygiene.

It is an objective of the invention to provide a multi-component dental implant system in which one or more components are held together in an individual's mouth with friction rather than screws.

It is a further objective of the invention to provide a multi-component dental implant system designed to be easily removed without the use of special removal tools.

It is yet another objective of the invention to provide a multi-component dental implant system designed to maintain healthy oral hygiene.

It is a still further objective of the invention to provide a multi-component dental implant system designed to enable patients to maintain the health of the surrounding tissues and prevent bone loss.

It is a further objective of the invention to provide a multi-component dental implant system designed to enable patients to prevent bone loss caused by peri-implantitis/gingivitis, exacerbated by a lack of hygiene.

It is yet another objective of the invention to provide a multi-component dental implant system designed to create parallelism with respect to neighboring or adjacent implant components within the same dental arch.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 14 illustrates multiple implant bodies with dental prosthesis engagement members secured to the first abutments, shown inserted into a bone ridge of a jaw mandible or maxilla of a jaw model;

DETAILED DESCRIPTION OF THE INVENTION

Figure 1A:
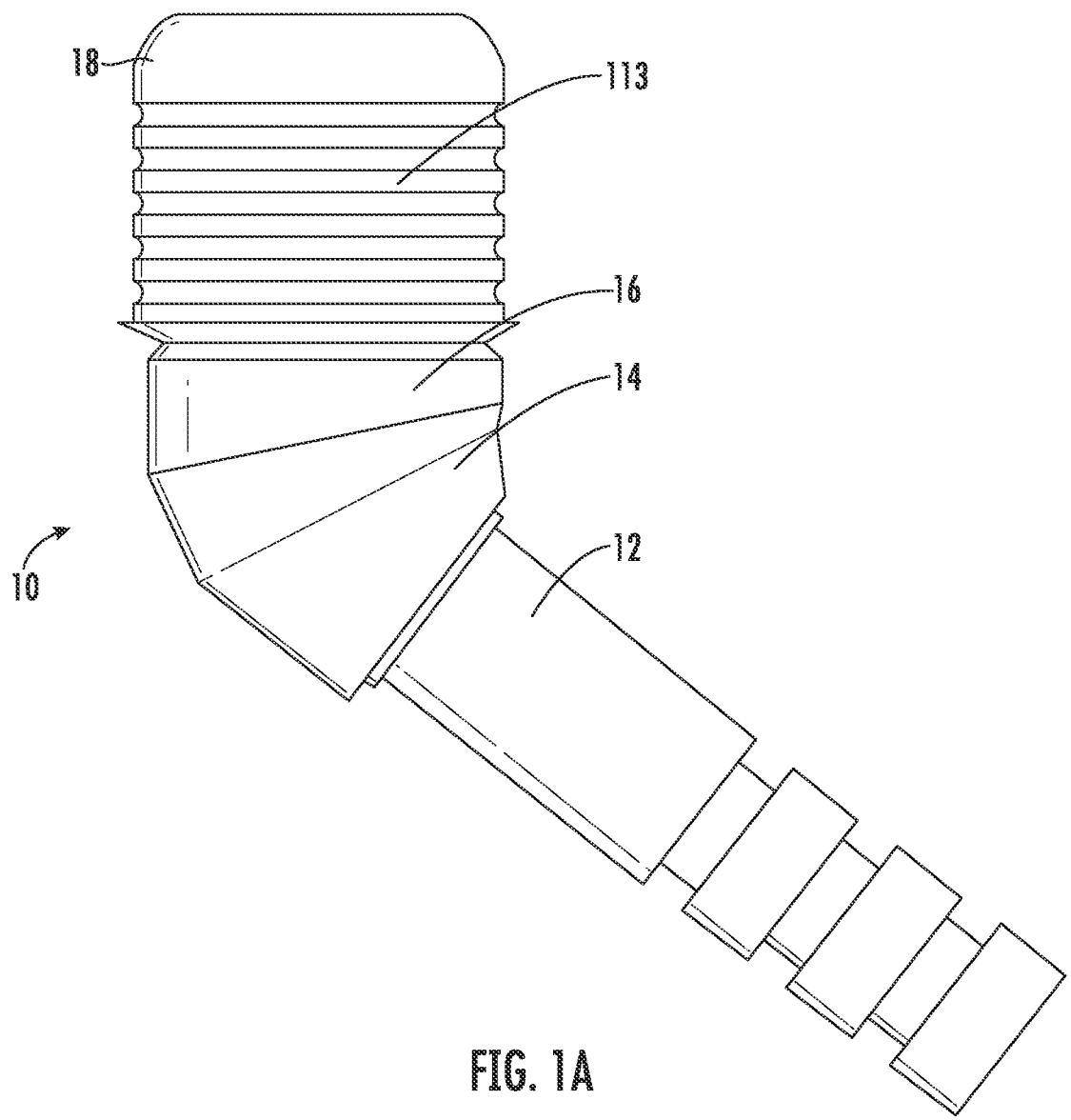
FIG. 1A illustrates an embodiment of a multi-component dental implant system.
Figure 1B:
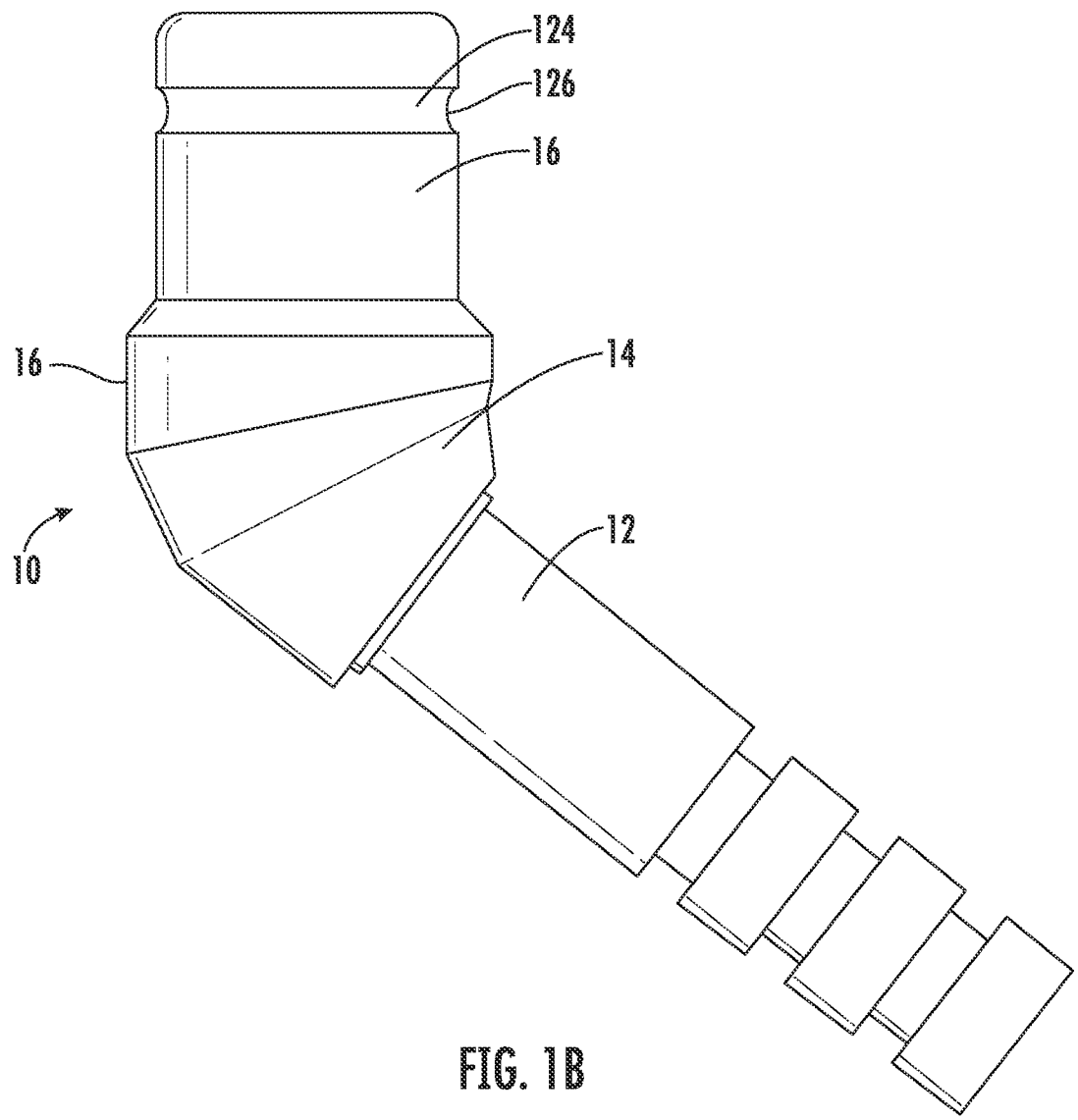
FIG. 1B illustrates the multi-component dental implant system shown in FIG. 1A, with the housing assembly removed.
Figure 1C:
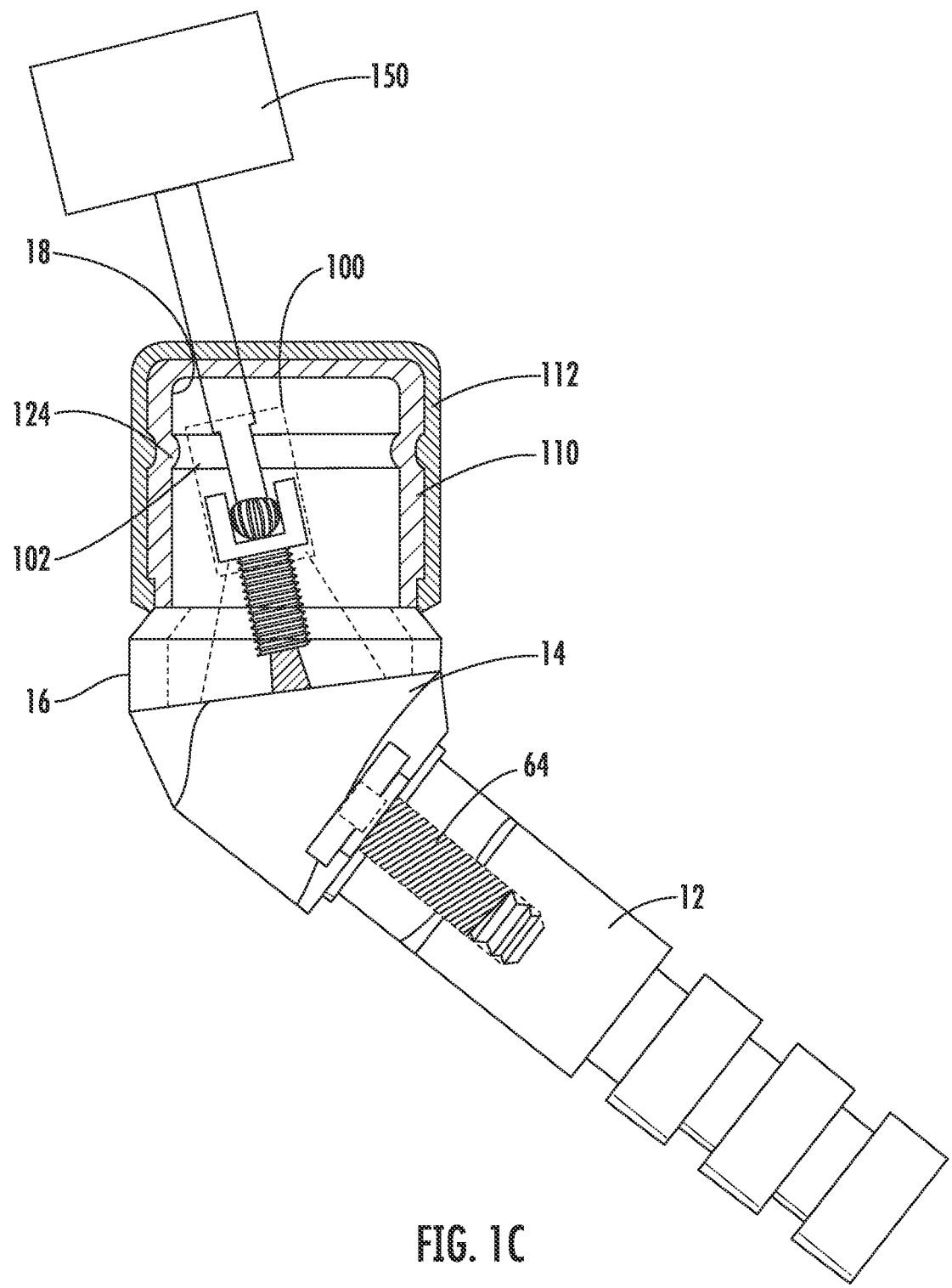
FIG. 1C is a front elevation view, partly sectioned, of the multi-component dental implant system shown in FIG. 1A.
Figure 1D:
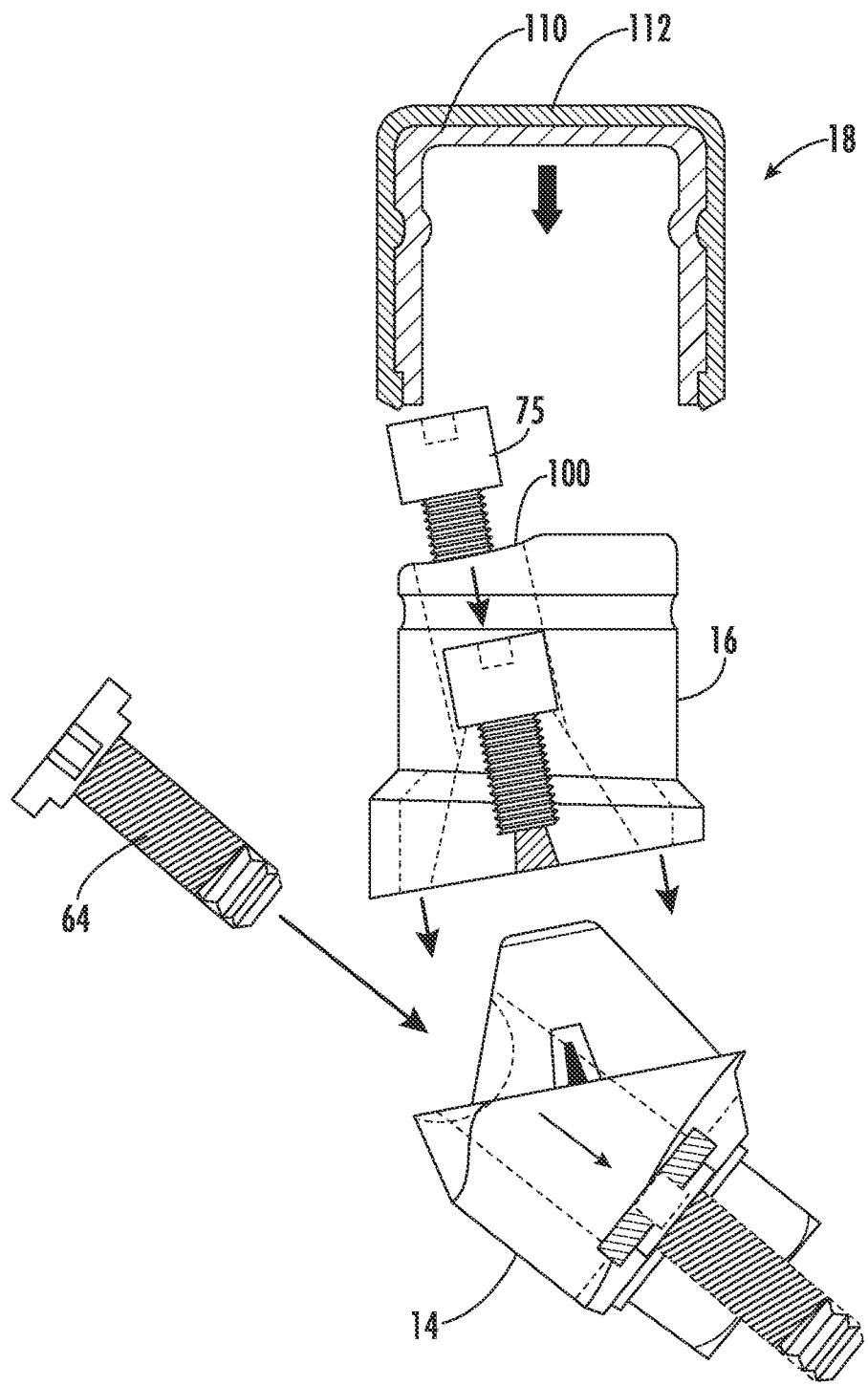
FIG. 1D is a sectioned, assembly view of the multi-component dental implant system.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
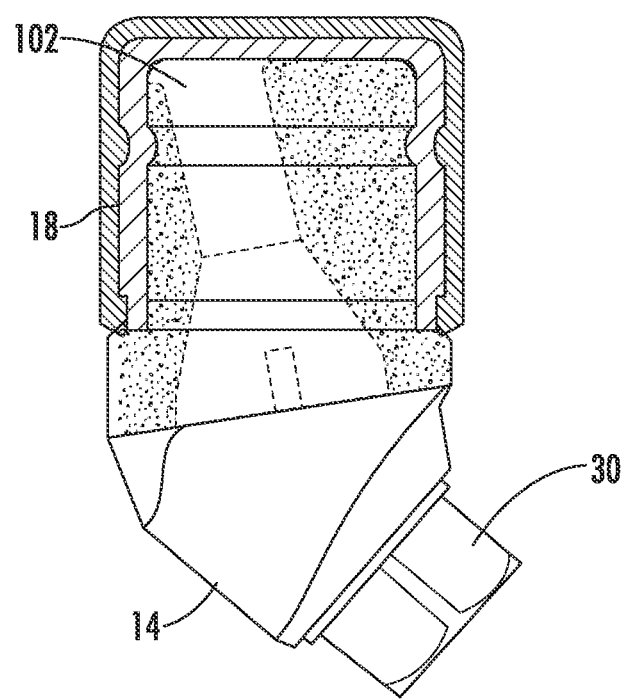
FIG. 2 is an illustrative embodiment of the multi-component implant system, shown partially sectioned and without the implant body or retaining screws.

Referring to FIGS. 1A-1D, an illustrative embodiment of a multi-component implant system, referred to generally as dental implant system 10, is shown. While illustrated as an entire system, the dental implant system 10 includes one or more of the individual components, individually or in any combination. The dental implant system 10 may comprise an implant body 12 configured to be insertable into at least a portion of an individual's mouth, a primary or first abutment 14 (may also be referred to as a primary structure), a dental prosthesis engagement member 16 (may also be referred to as a secondary structure), and a housing assembly 18 (may also be referred to as a tertiary structure). In use, the primary or first abutment 14 is designed to engage with and secure to the dental prosthesis engagement member 16, see FIG. 2. The housing 18 is configured to secure to or cover the dental prosthesis engagement member 16. The dental implant system 10 allows easy removal of one or more components, such as the attachment of the first abutment 14 to the dental implant 12 or a dental prosthesis, without the aid of any special tools or instruments other than a screw driver. Any of the individual components of the dental implant system may be prefabricated or custom made to individual patient needs.

The dental implant system 10 is configured to provide proper alignment when multiple dental implant systems 10 are inserted into a patient's mouth. In addition, the dental implant system 10 is configured to allow at least one component, a prosthesis, to be removable, preferably by the patient without the use of specialty implant tools, allowing the patient to remove and clean other components of the dental implant system 10, such as the implant body and abutments. Such configuration allows a patient to easily clean one or more of the individual components of the dental implant system 10, with full access to all sides of the implants that are implanted in the tissue.

Figure 6:
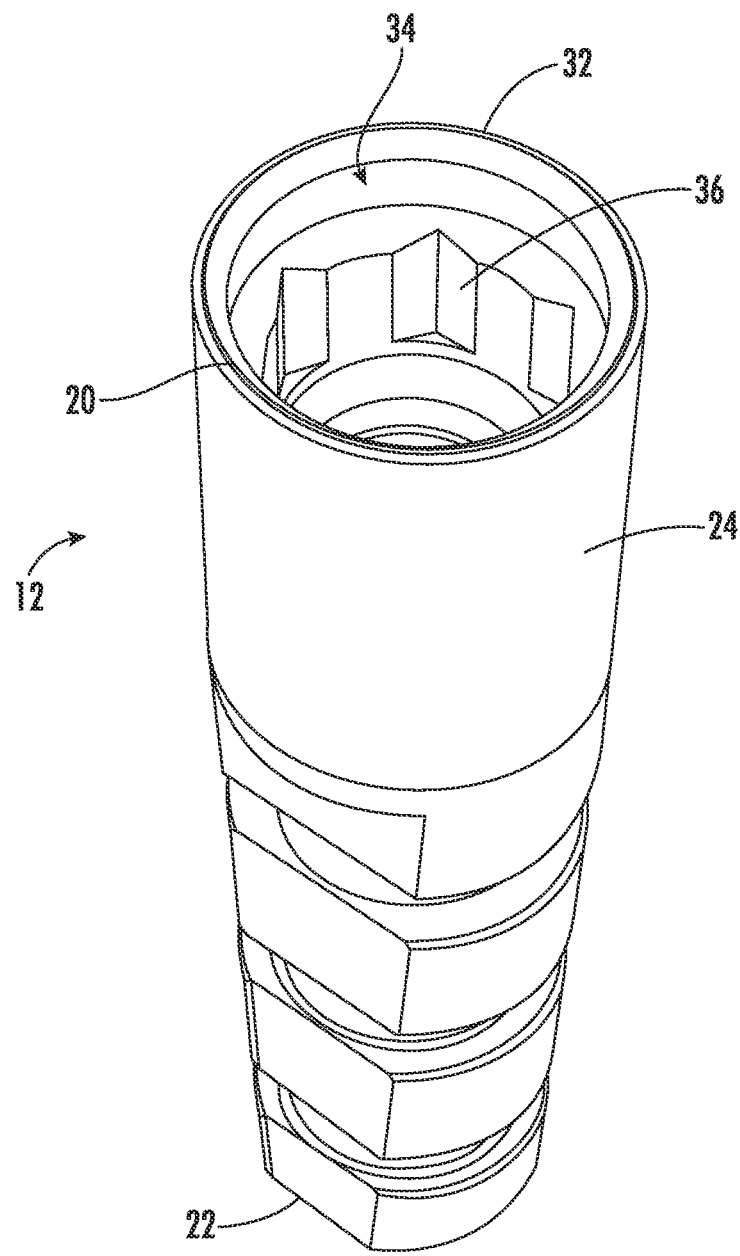
FIG. 6 is a perspective view of an illustrative embodiment of a dental implant.
Figure 7:
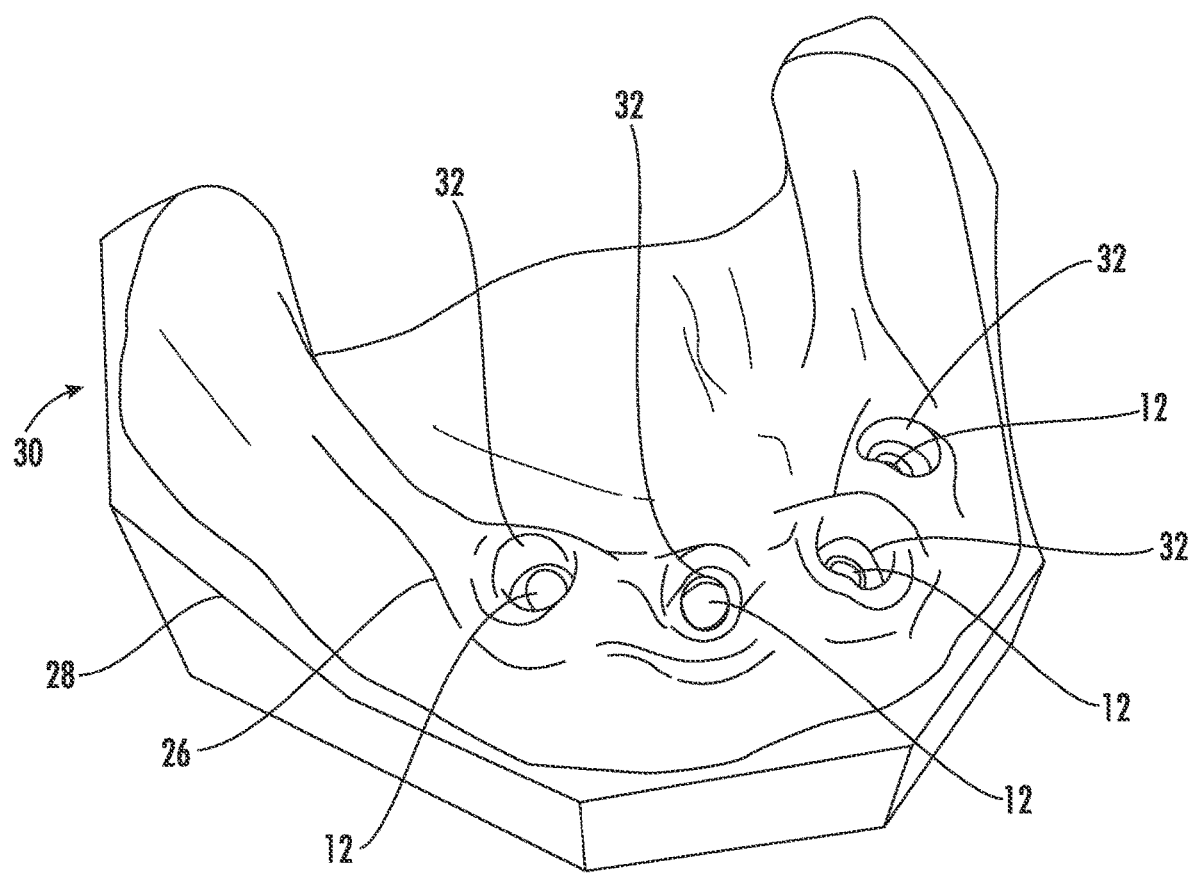
FIG. 7 is a perspective view of a dental arch shown with multiple (four) dental implant sites with the dental implants surgically implanted therein.

Referring to FIG. 6, an illustrative embodiment of the implant body 12 is illustrated. The implant body 12 comprises a first end 20, an opposing second end 22, and an elongated body 24 separating the first end 20 and the second end 22. The implant body 12 may be aconventional implant, such as an endosseous dental implant, and is configured to be surgically implanted into the bone ridge 26 of jaw mandible or maxilla 28, see FIG. 7. As illustrated, the dental arch 30 is shown with multiple (four) dental implant sites 32 having individual implant bodies 12 surgically implanted therein. The second end 22, which is inserted into the dental implant sites 32 first is preferably a closed end. The first end 20 comprises an opening 33, exposing an interior 34. The interior 34 may contain, at or near the first end 20, a first abutment member receiving member, illustrated as an internal (or external) hexagonal shape 36 configured to receive and secure to, with precision fit, at least a portion of the first abutment 14. While shown having a particular shape and size, such depiction is illustrative only. The implant body 12 can assume other shapes and/or sizes.

Figure 4:
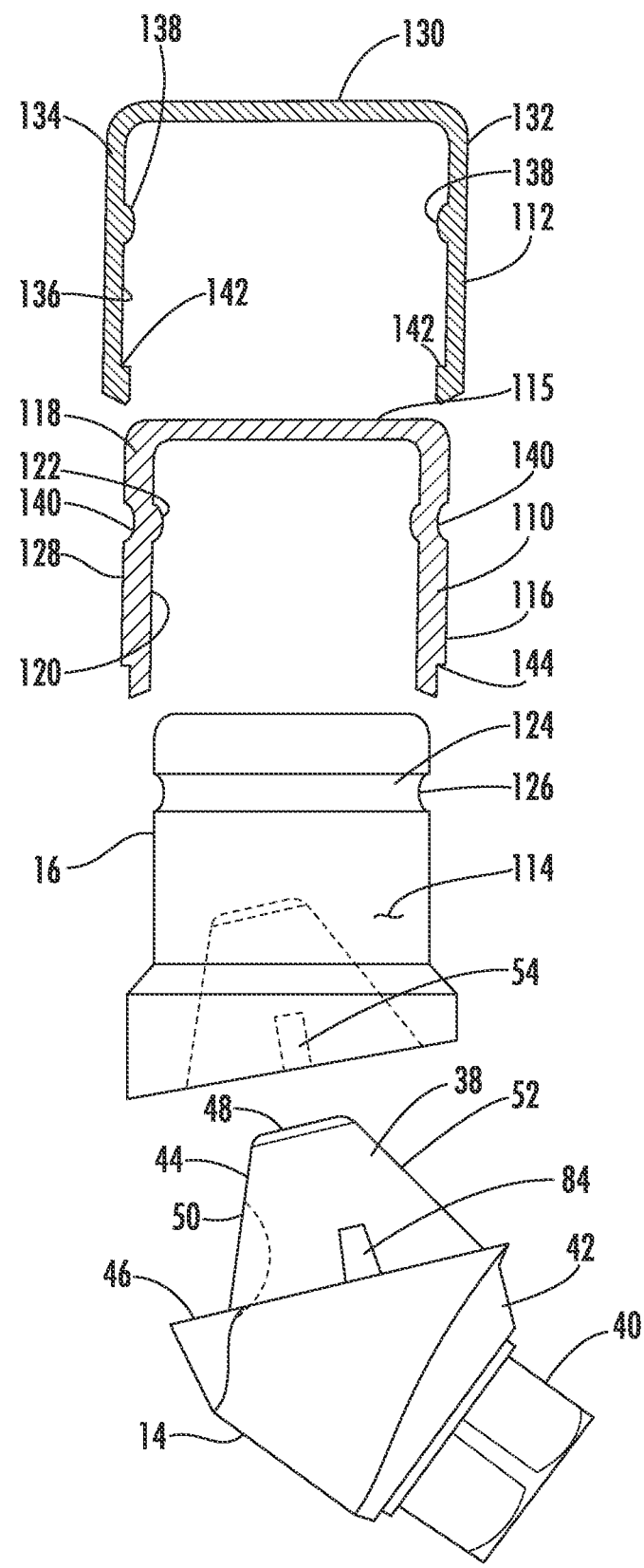
FIG. 4 is an alternative exploded view of the multi-component implant system shown with the housing and insert separated and without the dental implant portion and a dental prosthesis portion.
Figure 5:
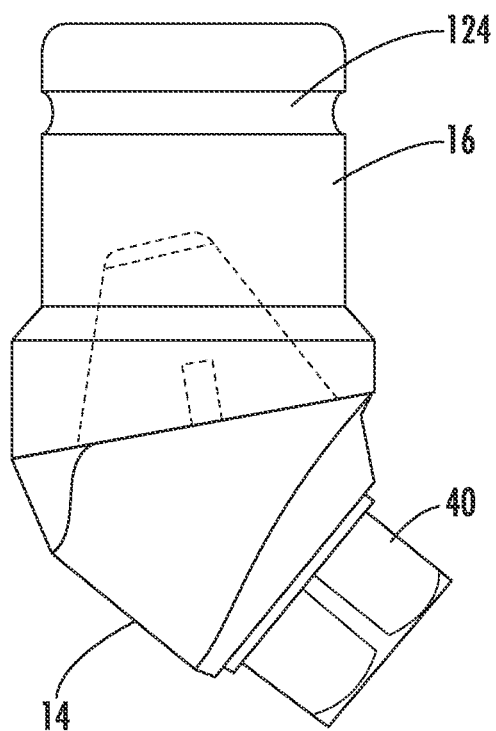
FIG. 5 illustrates components of the multi-component implant system stacked together.
Figure 8:
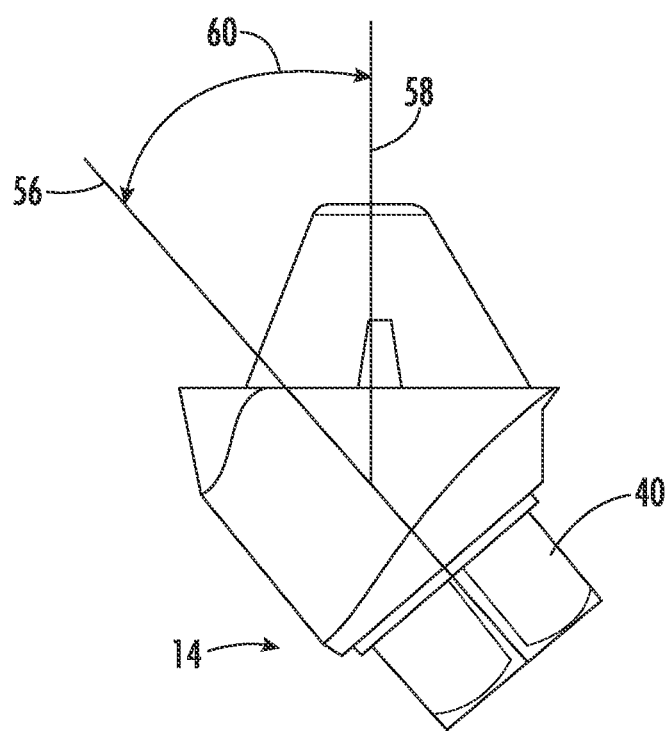
FIG. 8 is a perspective view of the primary or first abutment.

Referring to FIG. 4, the primary or first abutment 14 may comprise a first end 38 configured to receive and secure to at least a portion of the dental prosthesis engagement member 16, a second end 40 configured to receive and secure to at least a portion of the dental implant 12, and a main body 42 therebetween. The first end 38 may contain a first end body 44 extending upwardly, away from an upper surface 46 of the main body 42. The first end body 44 may have an upper surface 48, with two angled or diverging surfaces 50 and 52, thus forming a frustoconical or partial pyramid formation. The first end body 44 preferably comprises a first member of a first abutment to dental prosthesis engagement member locking system, illustrated herein as a female, clocking slot 54. The second end 40 may assume a hexagonal shape so as to fit with and secure to the first abutment member receiving member internal hexagonal shape 36 of the implant body 12. The second end 40 may be oriented so that its center plane or longitudinal axis 56 intersects a first end body center plane or longitudinal axis 58 at an angle, see FIG. 8. The primary or first abutment main body 42 may be modified so that the angle 60 formed by the intersection of the second end center plane or longitudinal axis 56 and the first end body center plane or longitudinal axis 58 is between zero degrees and less than 45 degrees, between zero degrees and thirty degrees, preferably between two degrees and thirty degrees, and even more preferably zero degrees, six degrees, ten degrees, fourteen degrees, seventeen degrees, twenty-two degrees, twenty-six degrees, or thirty degrees. Using primary first abutments 14 having different angles 60 provides a mechanism to where the primary first abutments 14, when inserted into the patient jaw, align in a parallel manner or near parallel manner relative to adjacent units. The dental implant system 10 may therefore utilize one or more primary first abutments 14 having the same varying angles 60, one or more primary first abutments 14 having different angles 60, or combinations thereof.

Figure 9:
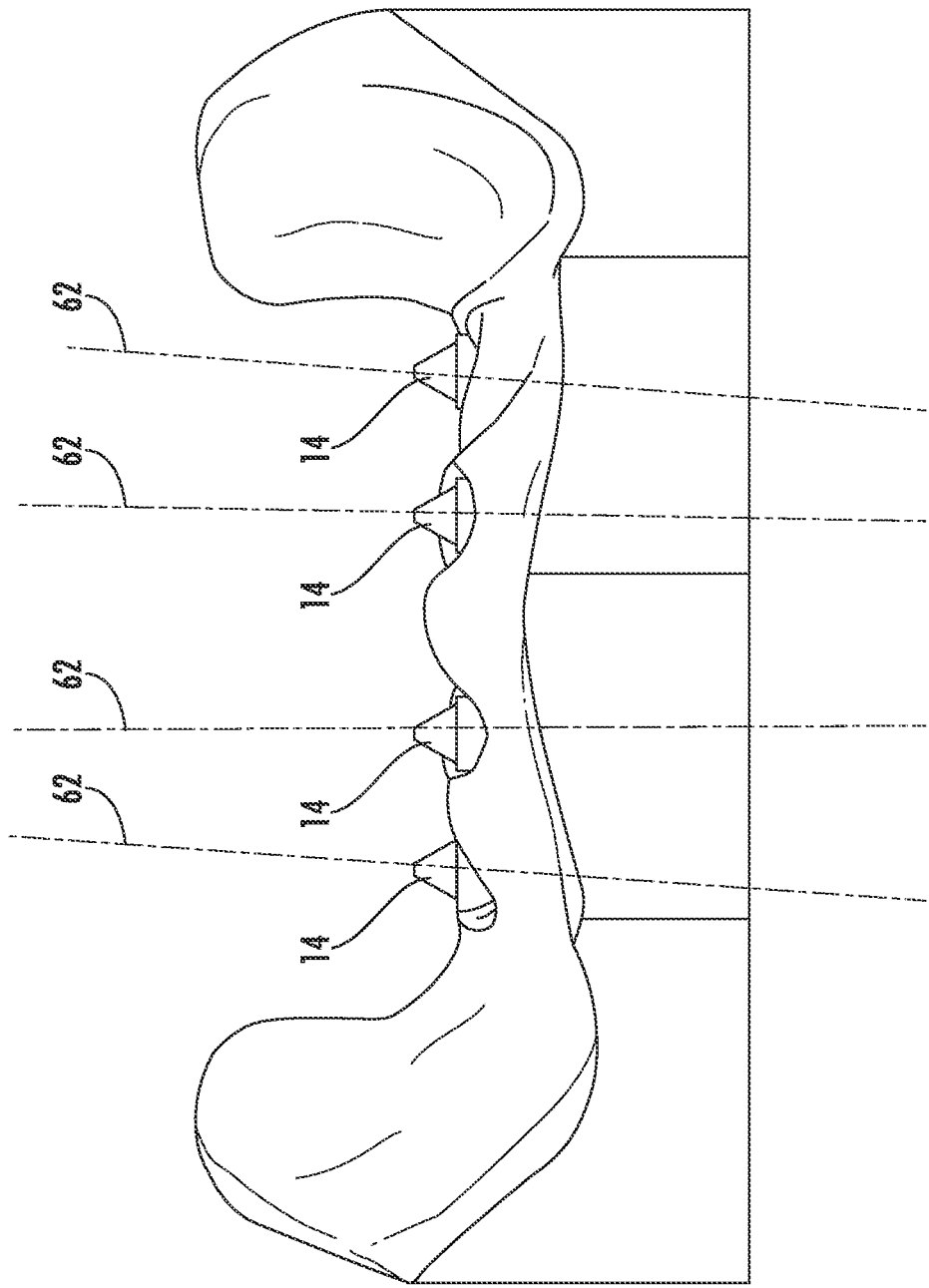
FIG. 9 is a perspective view of the jaw model shown in FIG. 7, illustrating the non-parallel arrangement of one or more of the primary abutments.

By choosing the correct primary first abutment angles 60 for each dental implant 12 inserted within the jaw, a dental practitioner can approximate parallel or near parallel arrangement. Referring to FIG. 9, vertical lines 62 illustrate positioning of multiple primary first abutments 14 placed to assume a position which is close to parallel relative to each other. As shown, there are still some discrepancies in which some of the multiple primary first abutments 14 are not in a parallel orientation or arrangement. The vertical lines 62 to the far left, for example, represent how the parallelism is slightly off from one of the primary/first abutments 14. Change of the angle 60 provides a mechanism to correct the slightly off parallel arrangement.

Figure 10:
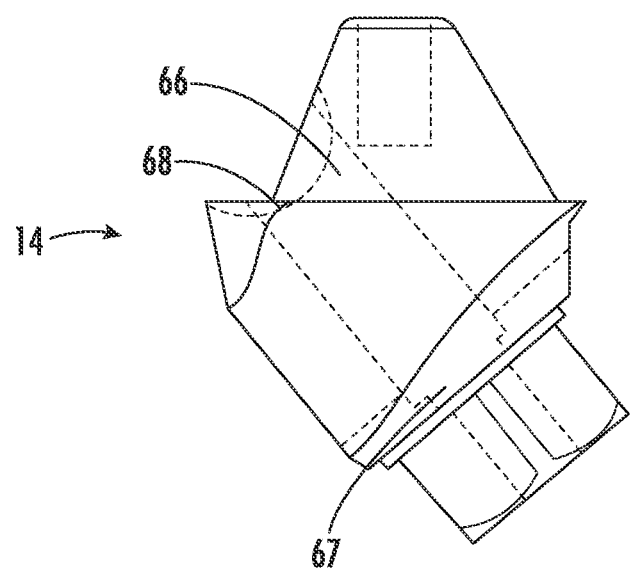
FIG. 10 is a sectional view of the primary/first abutment, shown with an implant body screw pathway and a dental prosthesis engaging member pathway.
Figure 11:
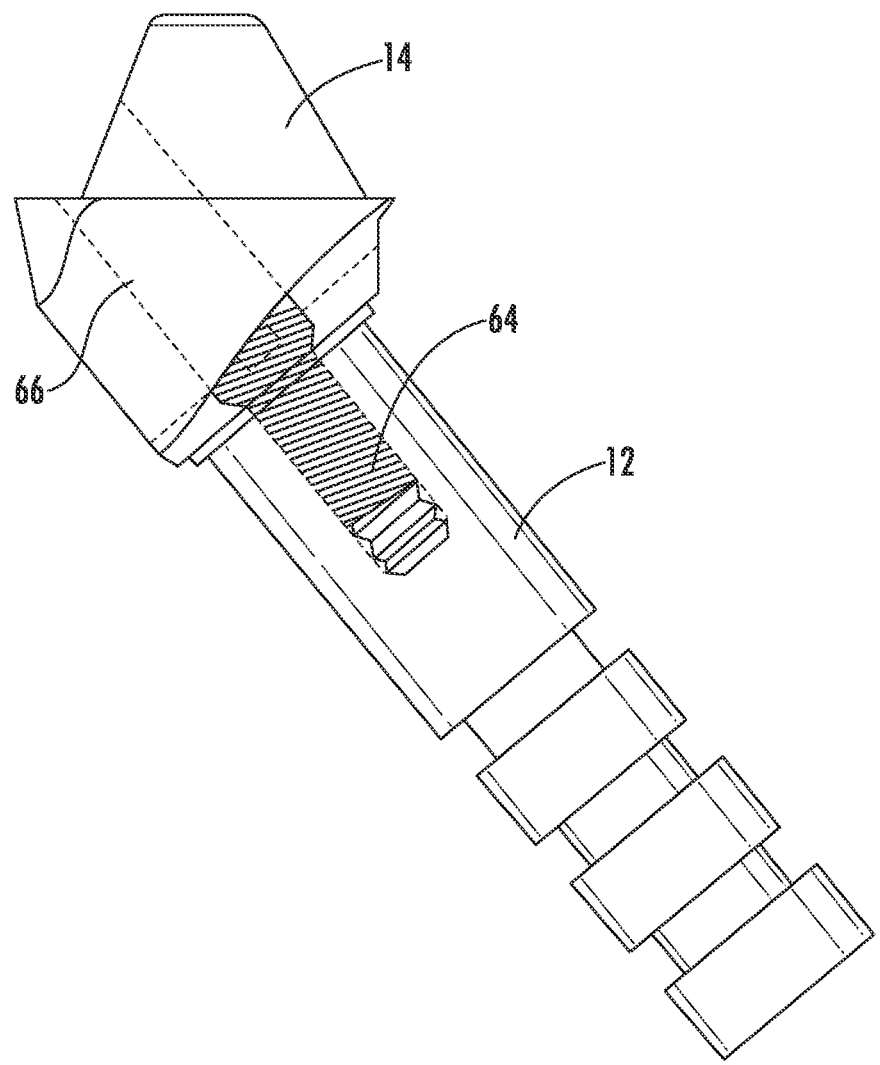
FIG. 11 is a sectional view, illustrating the securement of the primary abutment to the implant body.

To secure the primary/first abutment 14 to the implant body 12, a threaded screw 64 (see FIG. 10 or 11) may be inserted into a screw channel 66, resting in a screw seat 67. The screw channel 66 is in an offset or off-center position, with an off-center opening 68. This orientation allows a user to insert the threaded screw 64 at an angle through the first end body 44.

Figure 3:
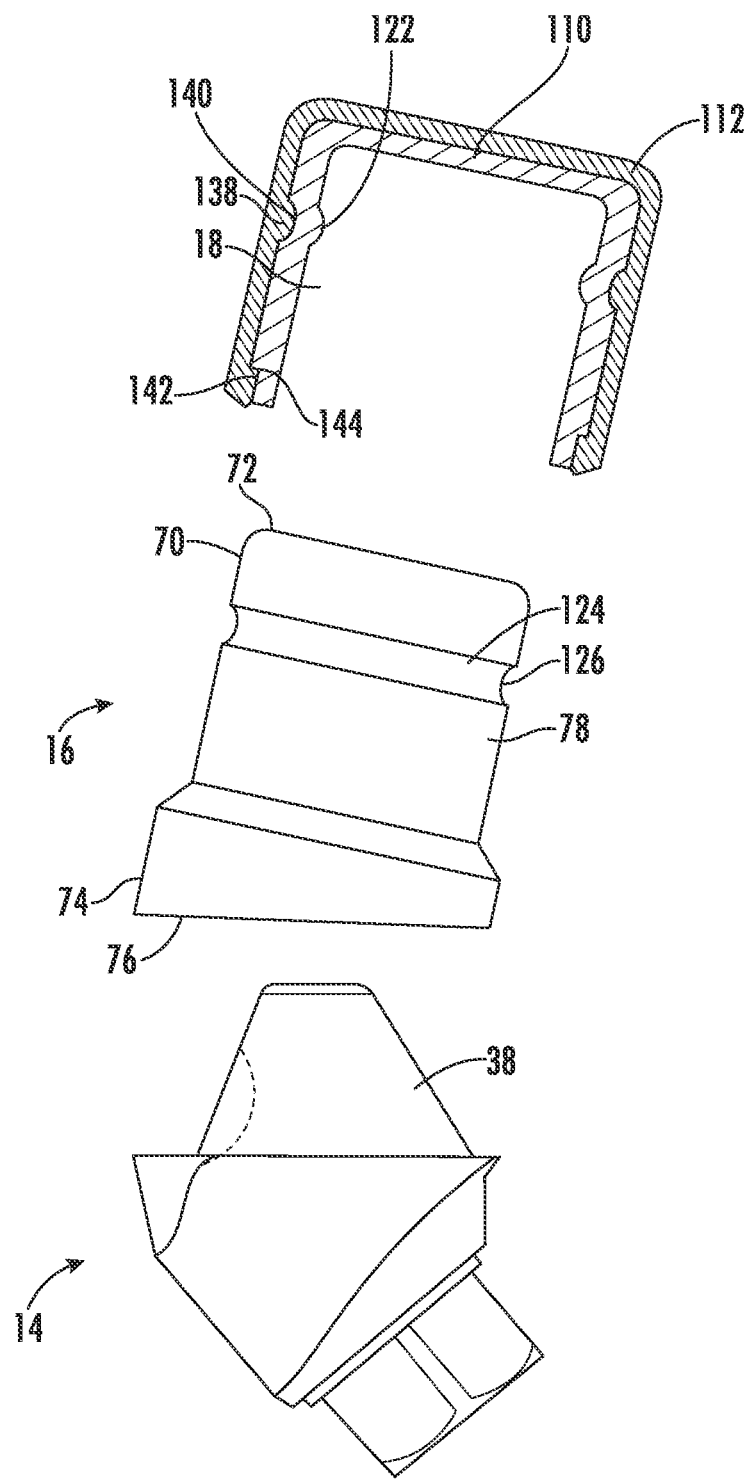
FIG. 3 is a front elevation view, partially sectioned, assembly view of the multi-component dental implant system, shown without the dental implant portion and retaining screws.
Figure 12:
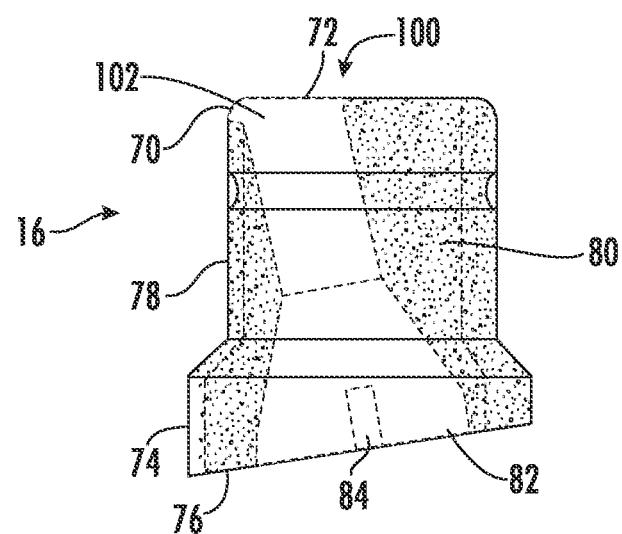
FIG. 12 shows the dental prosthesis engagement member.

Referring back to FIG. 3, the dental prosthesis engagement member 16 is shown having an upper end 70 having a top surface 72, a bottom end or collar 74 having a bottom edge 76, and a dental prosthesis engagement member main body 78 (may be referred to as the dental prosthesis engagement member cone) therebetween. The dental prosthesis engagement member interior 80, see FIG. 12, is configured to engage with at least a portion of the primary/first abutment 14. A primary/first abutment receiving section 82 is a cut out portion within the interior 80, and has a complimentary shape to that of the first abutment first end body 44. When the first abutment first end body 44 is inserted therein, it fits within the primary/first abutment receiving section 82, allowing the bottom edge 76 of the dental prosthesis engagement member 16 to rest on or butt against the upper surface 46 of primary/first abutment 14. To maintain the two components in place, the dental prosthesis engagement member interior 80 may comprise a second member of the first abutment to dental prosthesis engagement member locking system, illustrated herein as a male clocking slot 84. The male clocking slot 84 provides a mechanism to correctly align the dental prosthesis engagement member 16 with the primary abutment 14, and also place the dental prosthesis engagement member 16 in a parallel orientation relative to other dental prosthesis engagement members 16 inserted within the jaw. The male clocking slot 84 also provides anti-rotation between the primary abutment 14 and the dental prosthesis engagement member 16.

Figure 13A:
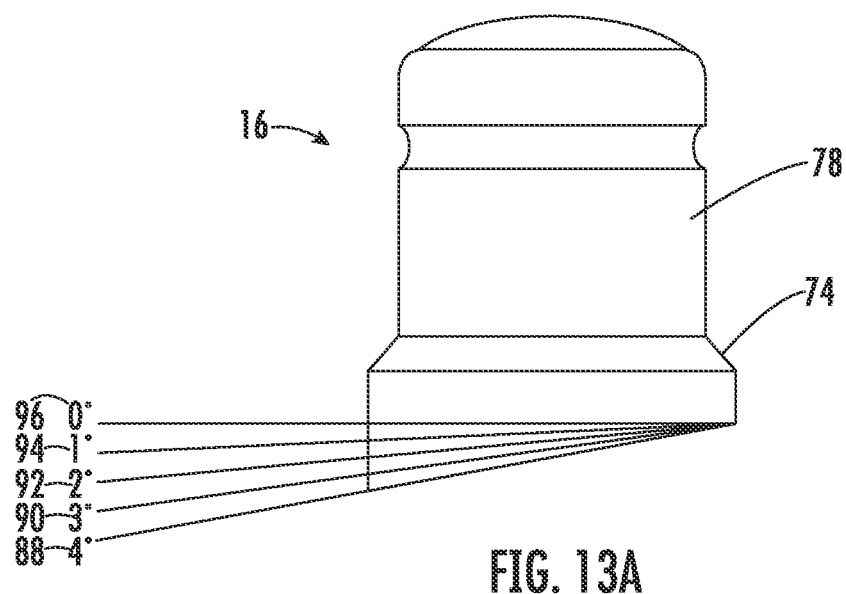
FIG. 13A is a perspective view of the dental prosthesis engagement member, illustrating the unique aspects of the bottom end.

The bottom edge 76 of the dental prosthesis engagement member 16 in FIG. 12 is illustrated as an angled surface. As such, the dental prosthesis engagement member 16 may be configured to have a four-degree angle, see line 88 on FIG. 13A, a three-degree angle, see line 90, a two-degree angle, see line 92, a one-degree angle, see line 94, or a zero-degree angle, see line 96. While the dental prosthesis engagement member 16 is shown with the bottom edge 76 to have an angled surface of zero to four degrees, it is preferred that the angle any be any value between zero and fifteen degrees, see FIG. 13B. Accordingly, the angle can be variable and have a non-whole number (i.e. 2.4 or 4.7) value or increments as well. The dental prosthesis engagement member 16 maybe custom made and configured to have a specific angle to correspond with other components, such as fit with the shape or angles associated with the primary abutment 14. In a dental arch with 4 dental implants, a patient may need varying degrees of correction to align in a prefect paralleled orientation. As such, dental implant system 10 may be configured so that dental prosthesis engagement member 16 may be designed to have an angle correction of 2.45 degrees for one implant body 12, a second dental prosthesis engagement member 16 may be designed to have an angle correction of 9.7 degrees for a second implant body 12, a third dental prosthesis engagement member 16 may be designed to have an angle correction of 11.2 degrees for a third implant body 12, and a fourth dental prosthesis engagement member 16 may be designed to have an angle correction of 5.5 degrees for a fourth implant body 12. The actual shape or angle of dental prosthesis engagement member 16 may be computer aided design (CAD) and computer aided milling (CAM), or other means, such as sinter laser melting (SLM) or possible 3D printing technologies. Accordingly, the dental implant system 10 may therefore utilize one or more primary dental prosthesis engagement members 16 having the same degree angled surfaces (i.e. all with one-degree angles), one or more primary first abutments 14 having different degree angled surfaces (i.e. one with a four-degree angle, one with a two-degree angle, one with a one-degree angle, and one with a zero-degree angle), or combinations thereof. As a result, a dental practitioner using the dental implant system 10 provides implants in which each of the individual implants are arranged in a more parallel orientation relative to each other. In typical use, the primary abutment(s) 14 will have several angle options to create rough degree of common orientation. The dental prosthesis engagement member 16 will have additional angle correction, preferably micro correction, to bring all assemblies to within one degree, or less, of parallelism of each other. The advantage of the dental implant system 10 provides components, that when placed in the user's mouth, are parallel in orientation and in relation to each other. As described later, angulation correction may as be corrected in the base or in the cone of the dental prosthesis engagement members 16.

Referring to FIG. 14, multiple implant bodies 12 with dental prosthesis engagement member 16 secured thereto are shown inserted into the bone ridge 26 of the jaw mandible or maxilla 28. In this alignment, the implant bodies 12 with dental prosthesis engagement members 16 are aligned so each longitudinal axis 98 of each single implant body 12 with dental prosthesis engagement member 16 is in a parallel relationship relative to each of the next or adjacent implant bodies 12 with dental prosthesis engagement members 16.

Figure 13B:
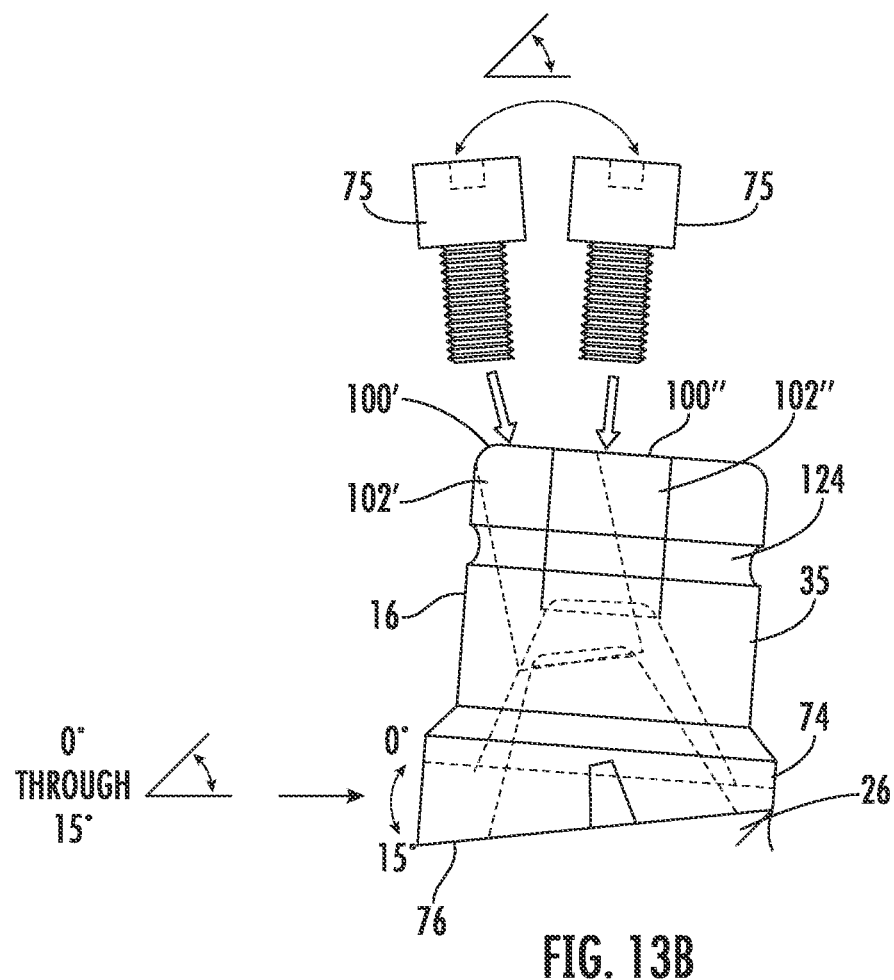
FIG. 13B is an alternative view of the dental prosthesis engagement member, illustrating the varying positioning of an opening and screw channel based on the varying angles associated with the dental prosthesis engagement member collar.

The dental prosthesis engagement member upper end 70 may include an opening 100 with screw channel 102, see FIG. 12. The opening 100 and screw channel 102 may vary in location depending on the required angled portions associated with dental prosthesis engagement member collar 74. FIG. 13B illustrates the opening 100 and screw channel 102 in the varying potions based on the varying angles between zero degrees and 15 degrees associated with the dental prosthesis engagement member collar 74. As an example, the opening 100 and screw channel 102 is illustrated with an off-center orientation 100' and 102' or center orientation 100" and 102". Teflon tape or a nylon plug may be used to plug the screw channel 102 after a threaded screw 75 has been inserted into place.

Figure 15:
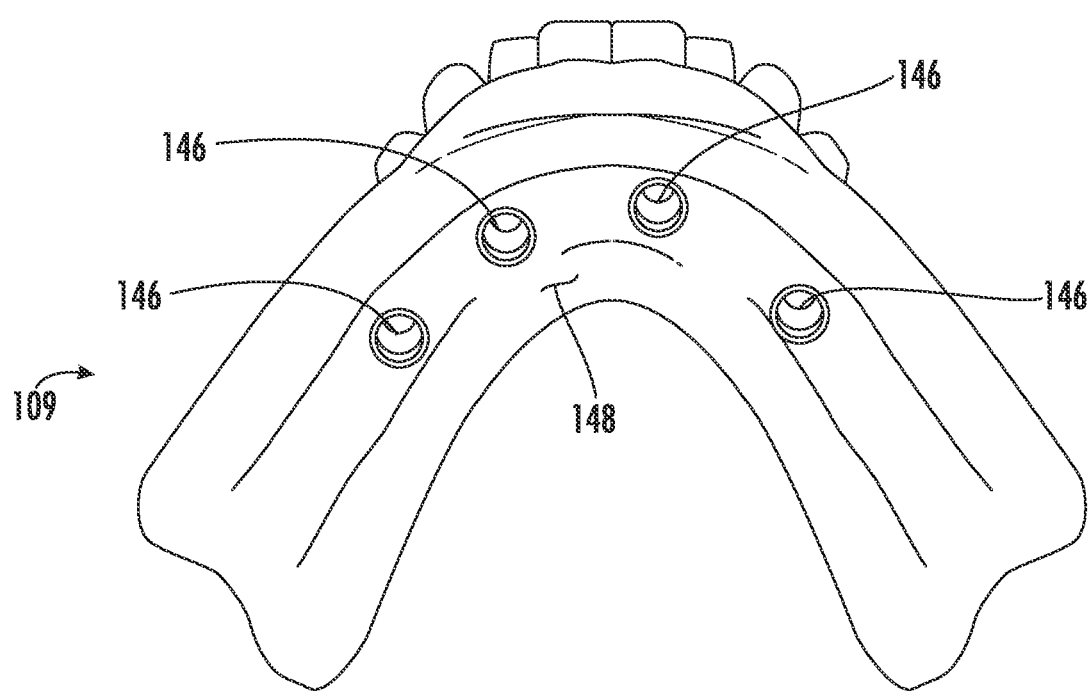
FIG. 15 is a perspective view of an illustrative example of a dental prosthesis.

The dental implant system 10 is designed to allow one or more types of dental prosthesis, such as dentures 109, see FIG. 15, to secure to the implanted implants 12. Accordingly, the dental implant system 10 may include the housing assembly 18. The housing assembly 18 is configured to secure to the dental prosthesis engagement member 16 along one surface and to a dental prosthesis along a second, independent surface. Referring now to FIGS. 1C, 3, 4 and 16, the housing assembly 18 may comprise an inner member 110, preferably a flexible inner member 110, and an outer member 112, preferably a rigid outer member 112. The outer member 112 may include one or more mechanical retention members, such as ribbing 113, see FIG. 1A. The inner member 110, which may be referred to as a retention sleeve, preferably a flexible nylon retention sleeve or other retention type material (such as polyetheretherketone (PEEK) or polymer material), which is designed to fit onto and secure to the outer surface 114 of the dental prosthesis engagement member 16 and comprises a top portion or wall 115 and two side portions 116 and 118. The bottom portion is open. The nylon retention sleeve 110 may be made of different retention strengths. If part of a kit, the nylon retention sleeve 110 may be provided in different colors to indicate nylon retention sleeves 110 having different retention strengths.

The side portions or walls 116 and 118 may form a continuous side wall. The inner surface 120 is configured to align with and rest along the dental prosthesis engagement member outer surface 114 when the two components are secured together. The side portions or walls 116 and 118 and or the inner surface 120 may have a taper which is conjugate to a parallel or slightly tapering of the dental prosthesis engagement member 16 so that when the two components are slid on together, the inner surface 120 and the dental prosthesis engagement member outer surface 114 properly align.

To properly secure to the dental prosthesis engagement member 16, the inner surface 120 may include an inner member dental prosthesis securing member 122, illustrated herein as a protrusion. The inner member dental prosthesis securing member protrusion 122 is sized, shaped, and arranged in a position to engage with and secure to a dental prosthesis engagement member outer surface housing assembly securing member 124, illustrated herein as a small depression or a concave circumferential donut shaped recess 126, see FIG. 3 or 4. When secured together, the inner member dental prosthesis securing member protrusion 122 snaps in and rests within the small depression or concave circumferential donut shaped recess 126.

The dental prosthesis engagement member outer member 112, which may be made of titanium, is designed to fit onto and secure to the outer surface 128 of the nylon retention sleeve 110, and comprises a top portion or wall 130 and two side portions 132 and 134. The side portions 132 and 134 may form a continuous side wall. The bottom portion is open. The inner surface 136 of the outer member 112 is configured to align with and rest along the nylon retention sleeve 110 when the two components are secured together. The side portions or walls 132 and 134 or the inner surface 136 may be parallel or have a taper which is conjugate to a parallel surface or tapering of the nylon retention sleeve 110 so that, when the two components are connected together, the outer member inner surface 136 and the nylon retention sleeve surface 128 properly align. An inner member to outer member securing portion, illustrated herein as a protuberance 138 positioned on the inner surface 136 of the outer member 112 is configured to engage with and secure to the outer member to inner member securing portion, illustrated herein as a concave recess 140. The concave recess 140 is positioned on the outer surface 128 of the inner member 110 and aligned in an opposite manner from the inner member dental prosthesis securing member protrusion 122. The concave recess 140 is sized and shaped to receive and hold therein the inner member to outer member securing portion protuberance 138, see FIG. 3. To aid in maintaining a secured housing assembly 18, the outer member 112 may include an inner shoulder 142 sized and shaped to click engage with a corresponding conjugate inner member outer shoulder 144.

Figure 16:
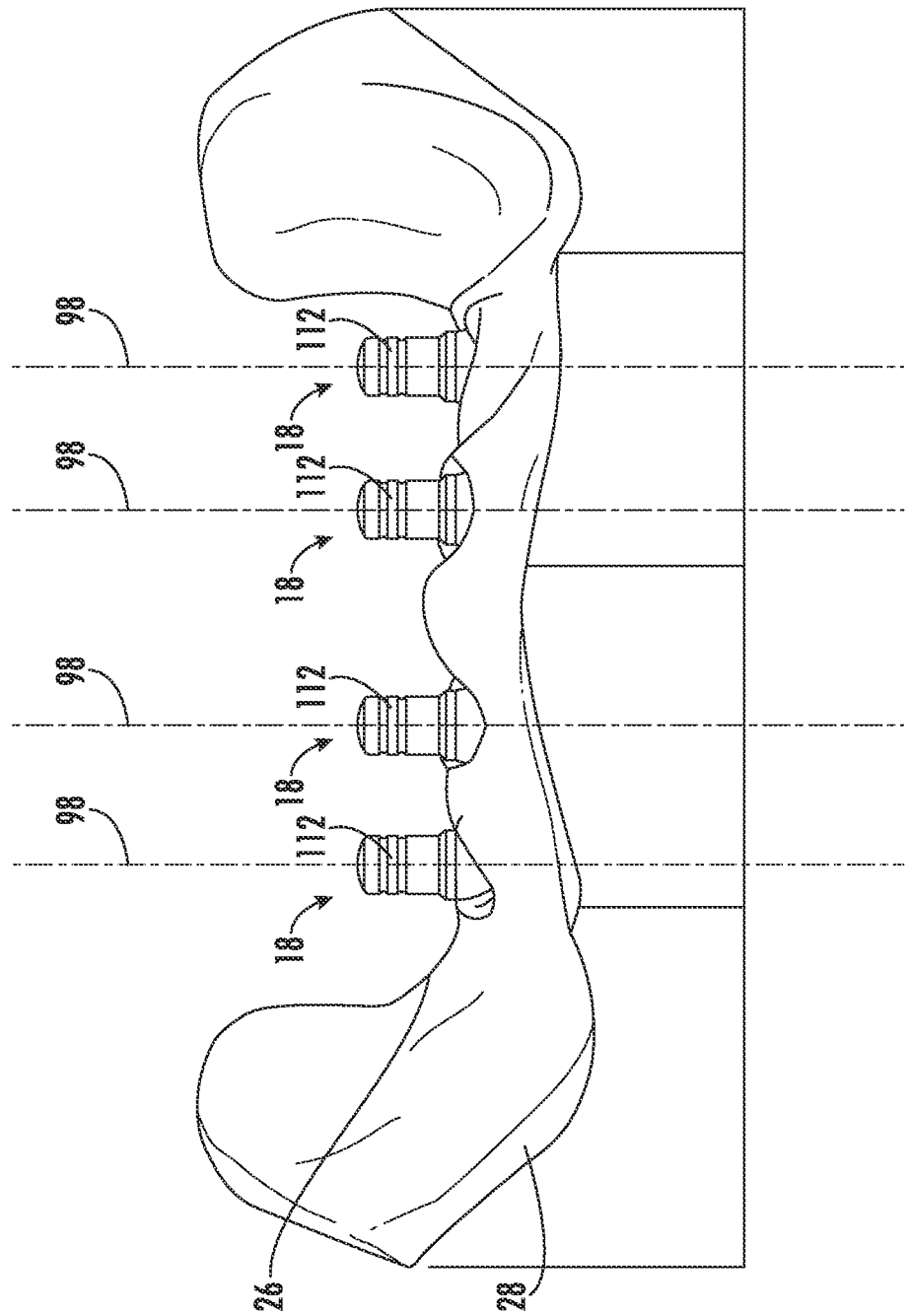
FIG. 16 illustrates multiple implant bodies with a housing assembly secured thereto, shown inserted into a bone ridge of a jaw mandible or maxilla of a jaw model.

To aid in securing the dental prosthesis, such as the denture 109, one or more portions of the housing assembly 18 is inserted into the denture 109. Referring back to FIG. 15, the denture 109 is shown with openings 146 on the upper surface 148. Placed within the denture surface opening 146 may be the housing assembly 18. In this case, the user may simply secure the denture 109 to the dental implant body 12 by securing the housing assembly 18 denture surface opening 146 to the dental implant bodies 12 implanted within the jaw so they secure to corresponding dental prosthesis engagement members 16 secured thereto. Alternativity, the denture surface opening 146 may be aligned with dental implant bodies 12 having the housing assembly 18 already secured to the dental prosthesis engagement members 16. FIG. 16 illustrates multiple implant bodies 12 with the housing assembly 18 secured thereto inserted into the bone ridge 26 of the jaw mandible or the maxilla 28. For illustrative purposes, the denture 109 is not shown. In actual use, the housing assembly 18 would not be secured to dental implant bodies 12 without being inserted into the prosthesis.

The dental implant system 10 may be provided as a kit. Accordingly, the kit may contain (1) one or more of the implant body 12, (2) one or more of the primary or first abutment 14, (3) one or more of the dental prosthesis engagement member 16, (4) one or more of the housing assembly 18, including one or more of the inner members 110 and outer members 112, or any combination thereof.

Figure 17:
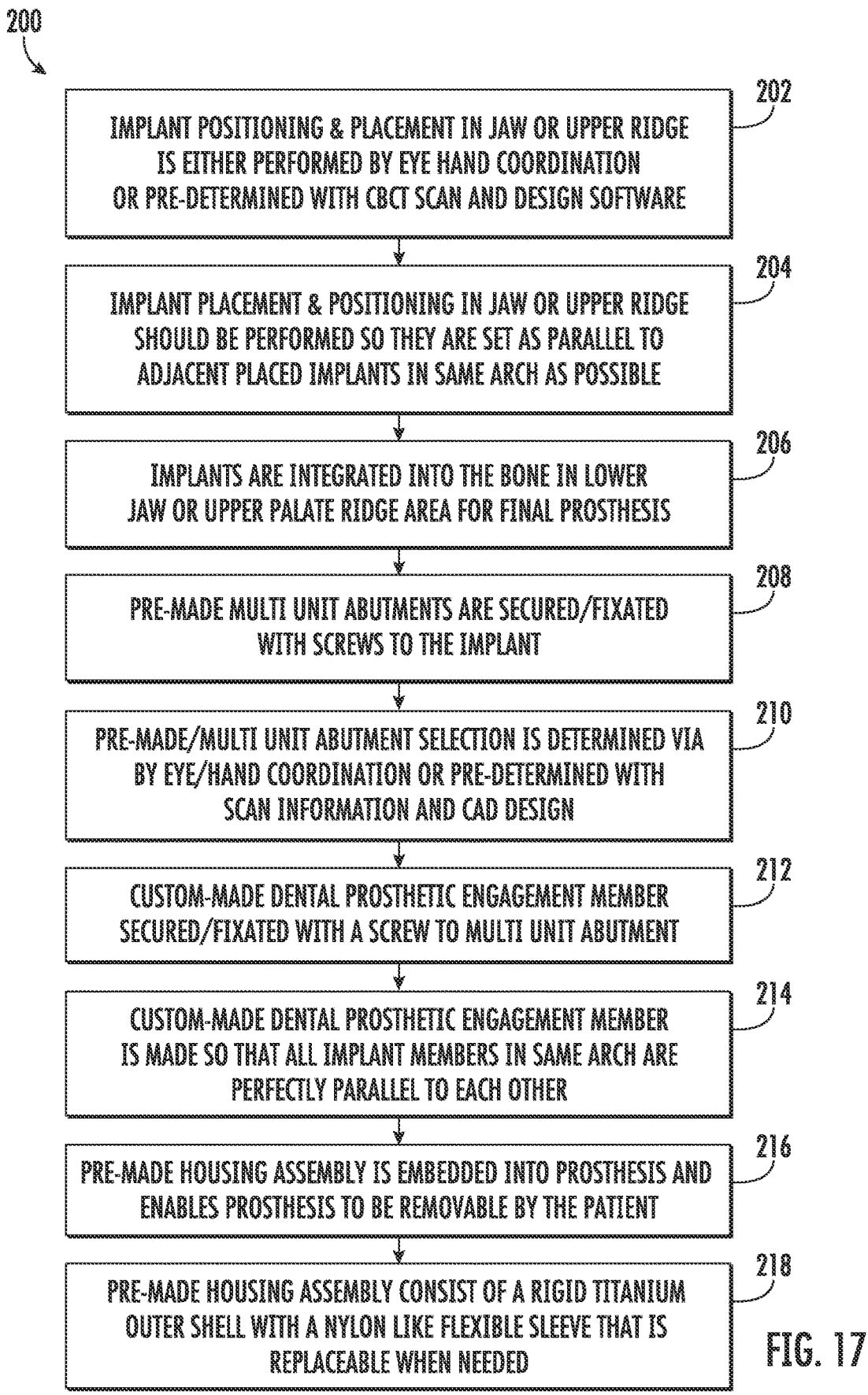
FIG. 17 is a schematic diagram illustrating an embodiment of a dental implant system method of use.

Referring to FIG. 17, a schematic diagram of a method of use 200 associated with the dental implant system 10 is provided. The dental implant body 12 positioning and placement in the jaw or upper ridge may be accomplished by visualization or by scanning, see step 202, and preferably set to be parallel to adjacent implants, see step 204. The dental implant body 12 can be integrated into the bone of the jaw or upper ridge for the final prosthesis see step 206. To an existing dental implant body 12 (or one inserted by a user such as a dental practitioner) integrated into the bone in the jaw or upper palate ridge area, see step 208, a user secures the first abutment 14 thereto, see step 210. Selection of the first abutment 14 may be made by visualization or computer aided, see step 210. The user may then secure the dental prosthesis engagement member 16 to the first abutment 14, step 212. The dental prosthesis engagement member 16 is preferably made so to achieve parallel implants (using components with varying degrees associated with the dental prosthesis engagement members 16 or the first abutments 14) in the same arch, see step 214. The user then secures one or more portions of the housing assembly 18 to the dental prosthesis engagement member 16, step 216. The housing assembly 18 is configured to fit on the dental prosthesis engagement member 16 via friction and geometry. As such, no fasteners are required. The user may use an angulated driver 150 or common dental screw driver, see FIG. 1C, to drive the screw in attaching the dental prosthesis engagement member 16 to the primary abutment 12. One or more components of the dental prosthesis engagement member 16 (i.e. the outer shell or outer member 112, or flexible sleeve or the inner member 110), when required, may be replaced, see step 218.

Referring to FIGS. 18A-20, the dental implant system 300 is shown with alternative embodiments of one or more components as described above. The dental implant system 300 performs many of the same functions and uses as described previously, differing mostly in one or more structural features of several components, as will be described below. Except where noted, the one or more components of the dental implant system 300 have the same components or features associated with the components of the dental implant system 10 described above. Accordingly, the dental implant system 300 may include or be attached, secured, or fixed to an implant body 12 configured to be insertable into at least a portion of an individual's mouth, a primary or first abutment 314 (may also be referred to as a primary structure or multi-unit abutment, and is similar to abutment 14), a dental prosthesis engagement member 316 (may also be referred to as a secondary structure or a coping, and is similar to dental prosthesis engagement member 16), and a housing assembly 318 (may also be referred to as a tertiary structure, and similar to housing assembly 18). The primary or first abutment 314 is shown with a main body 320 having a first end 322 configured to receive and secure to at least a portion of the dental prosthesis engagement member 316. The primary or first abutment 314 may also include a second end 333, similar to the second end 40, which is configured to receive and secure to at least a portion of the dental implant 12.

Referring to FIGS. 21A-21E, the dental prosthesis engagement member or coping is shown in an unprocessed or "blank" format and referred to as the dental prosthesis engagement member or coping 316'. As such, the dental prosthesis engagement member or coping 316' may be machined to add various features as needed. The dental prosthesis engagement member or coping 316' is shown having a main body 336 having an upper end 338 and a lower end 340. At the upper end 338 is an upper surface 342 having an opening 344. As shown in the figures, the opening 344 may be centered within the upper surface 342. Extending away from the lower end 340 is an abutment engagement member 348 configured to engage with and secure or affix to at least a portion of the primary or first abutment 314. The abutment engagement member 348 may have a tapering or diverging surface 350, forming a frustoconical or partial pyramid formation, thus forming a smaller profile than the dental prosthesis engagement member or coping main body 336. At the end of the diverging surface 350 is a second opening 352. The opening 352 may include an abutment locking member 354 configured to engage and lock with at least a portion of the primary or first abutment 314. The abutment locking member 354 provides an alternative mechanism to the keyed male-female clocking mechanism (male clocking slot 84 and female clocking slot 54) described in the dental implant system 10. While the structures are different, both locking mechanisms rely on key type format, where a first member is designed to fit and lock (unlock if needed) specifically to a second member. The abutment locking member 354 may include a first elongated surface 356, a second elongated surface 358, a third elongated surface 360, and a fourth elongated surface 362. The first elongated surface 356 and the second elongated surface 358 are separated by a space and are arranged in a generally parallel manner relative to each other. The third elongated surface 360 and the fourth elongated surface 362 are separated by a space and are arranged in a generally parallel manner relative to each other.

Figure 18A:
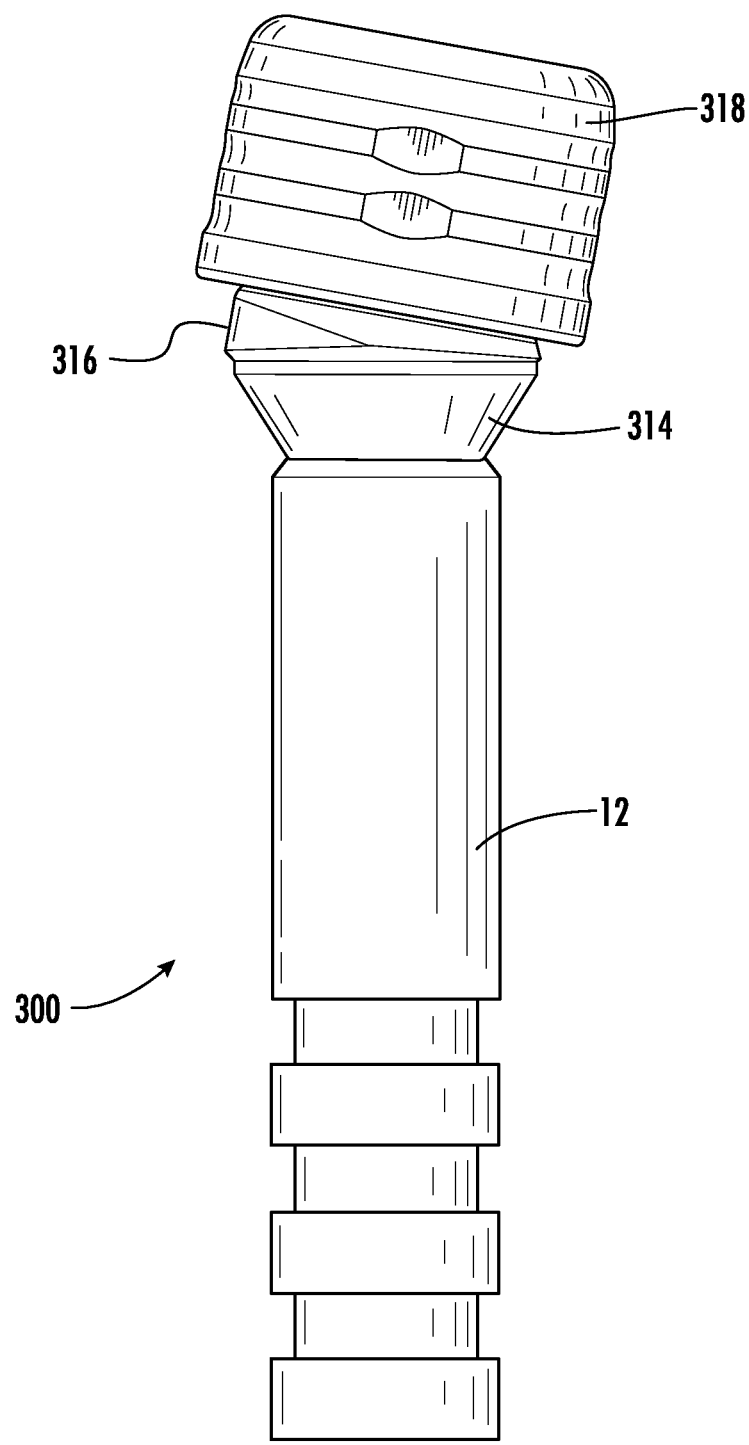
FIG. 18A is a side view of an alternative embodiment of an illustrative example of the multi-component dental implant system.
Figure 18B:
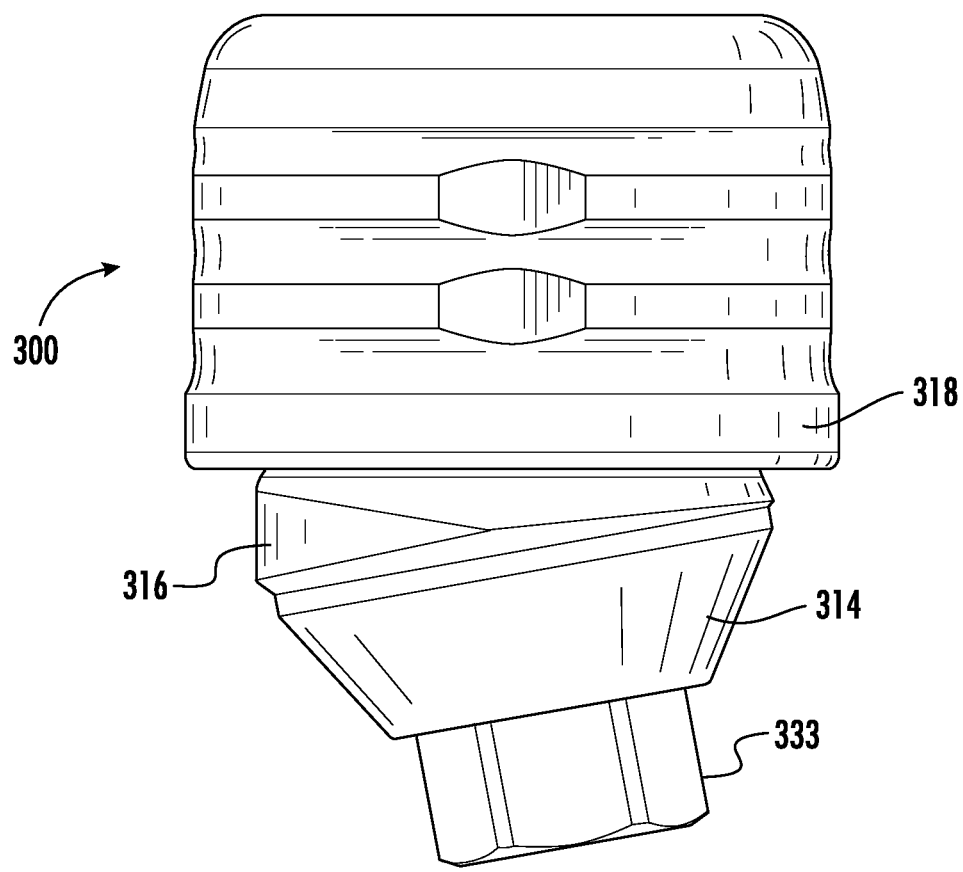
FIG. 18B is a side view of the multi-component dental implant system illustrated in FIG. 18A, shown with the dental implant removed.
Figure 18C:
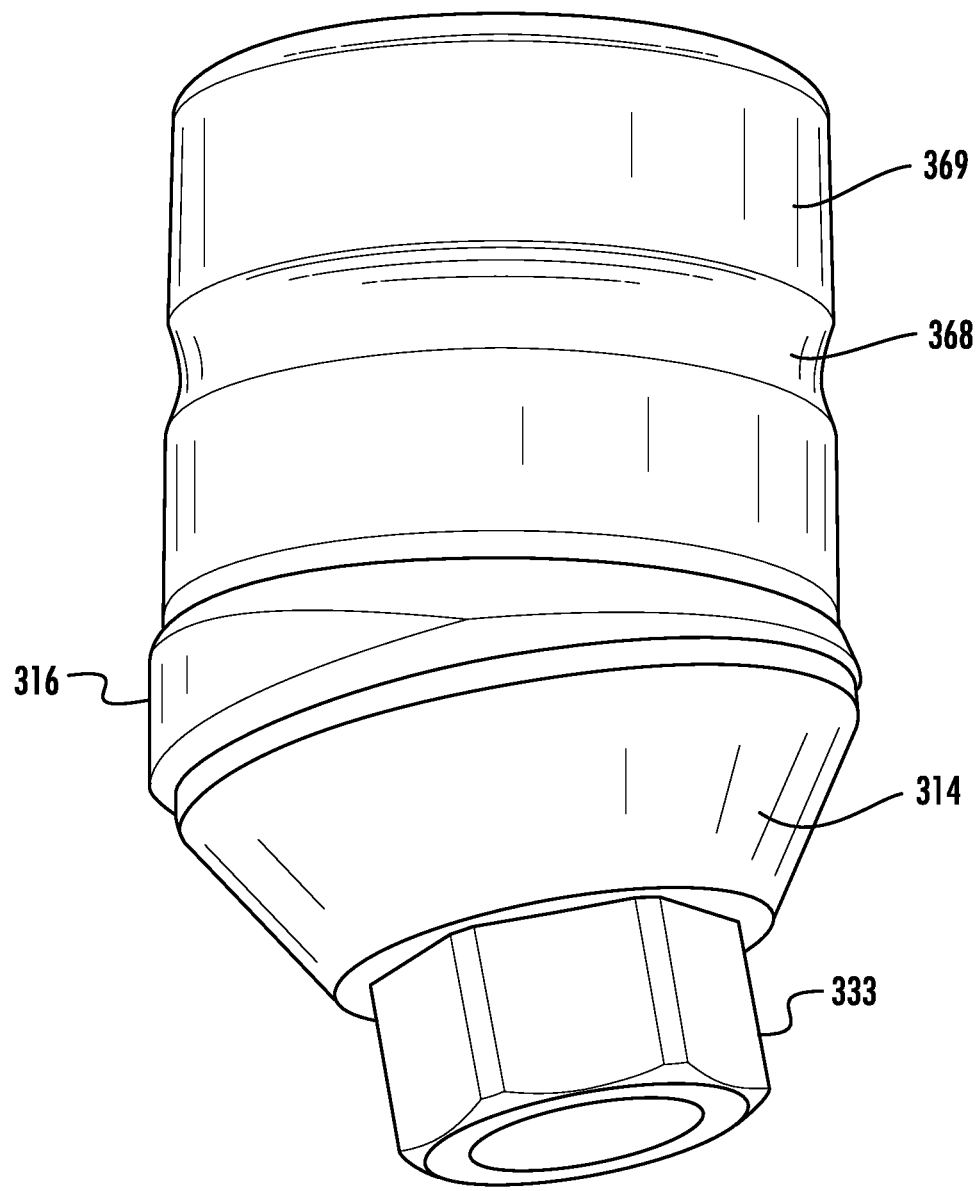
FIG. 18C is a perspective view of the multi-component dental implant system illustrated in FIG. 18A, shown with the housing assembly removed.
Figure 18D:
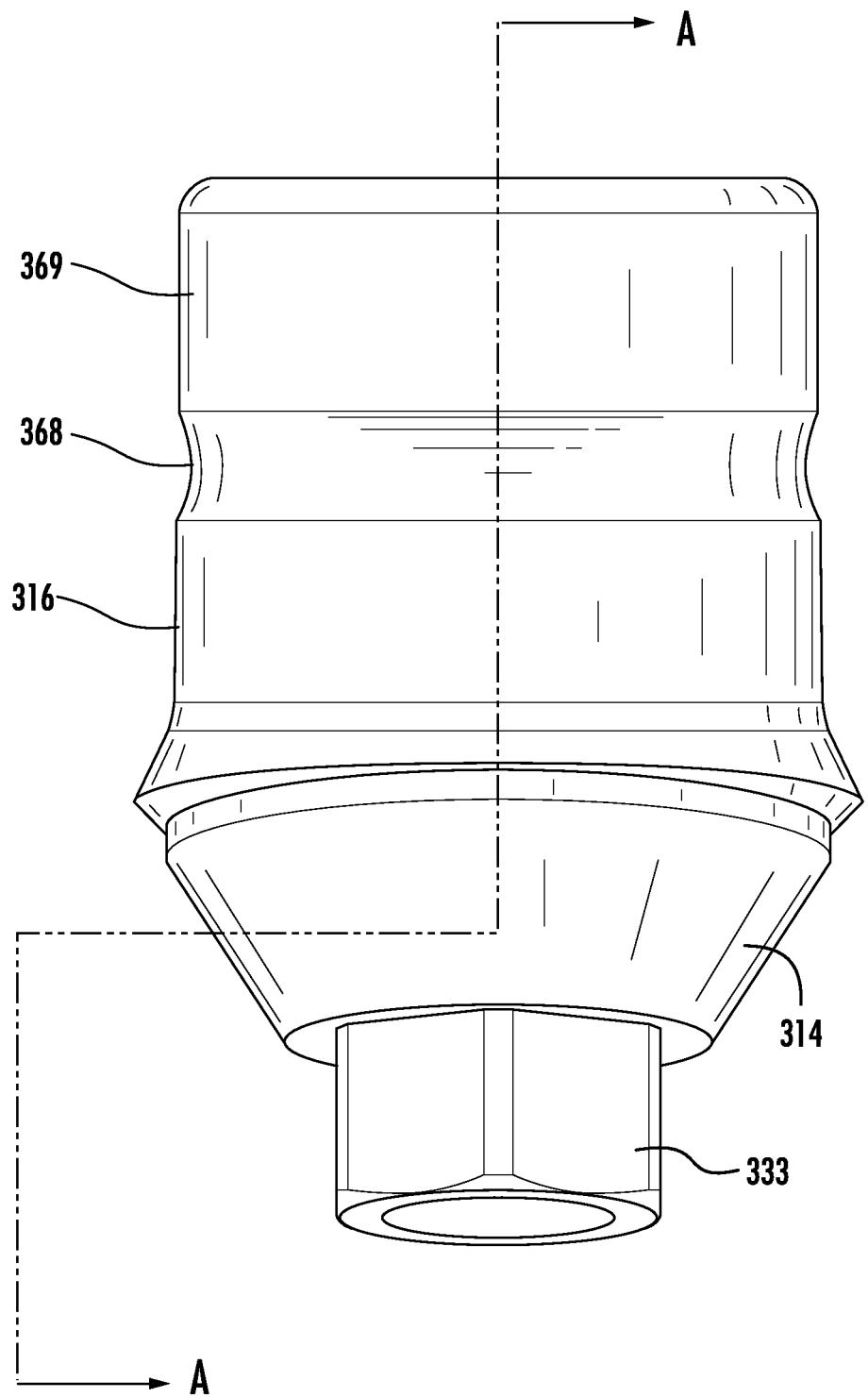
FIG. 18D is a side view of the multi-component dental implant system illustrated in FIG. 18C.
Figure 18E:
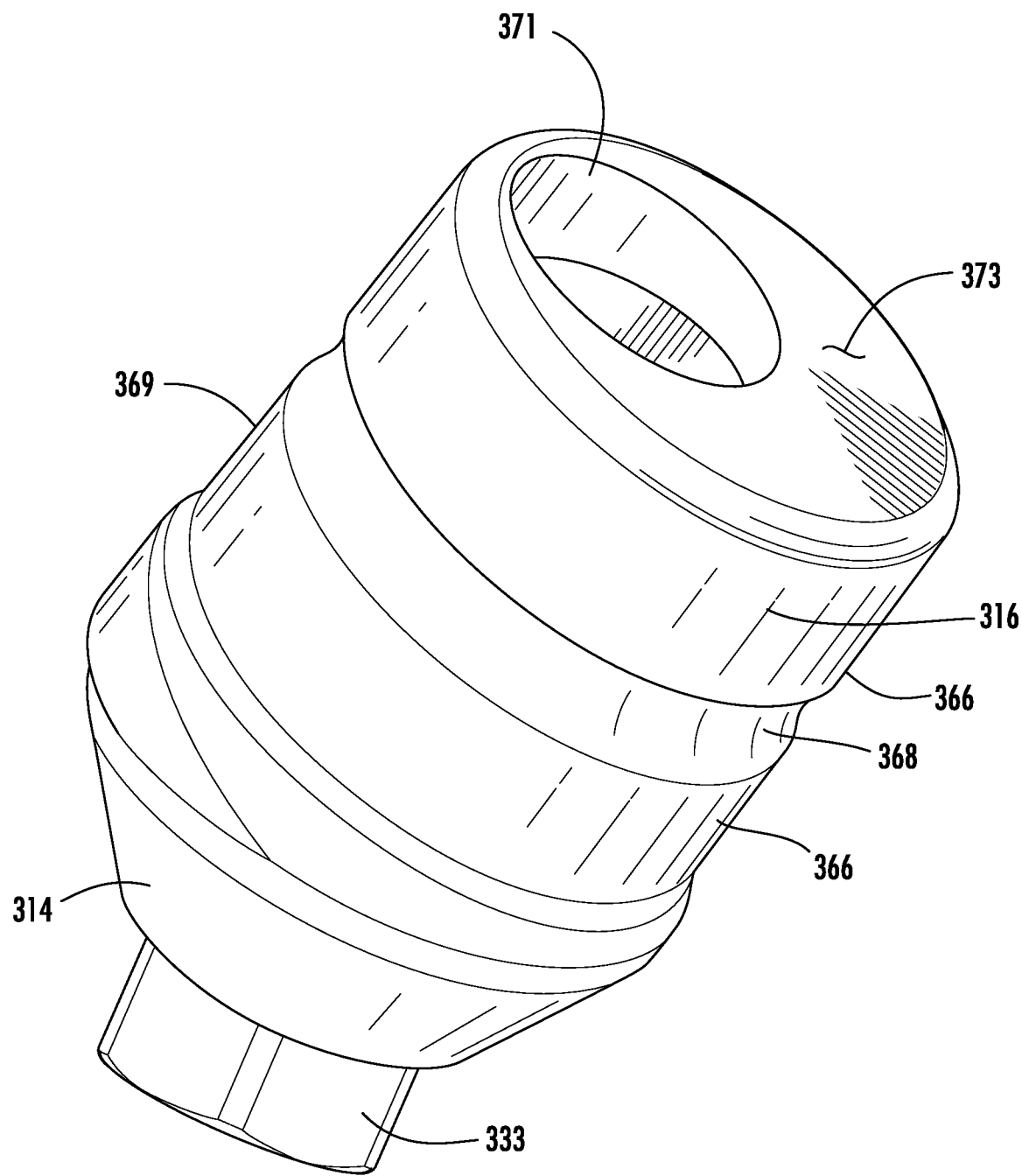
FIG. 18E is an alternative perspective view of the multi-component dental implant system illustrated in FIG. 18C.
Figure 19:
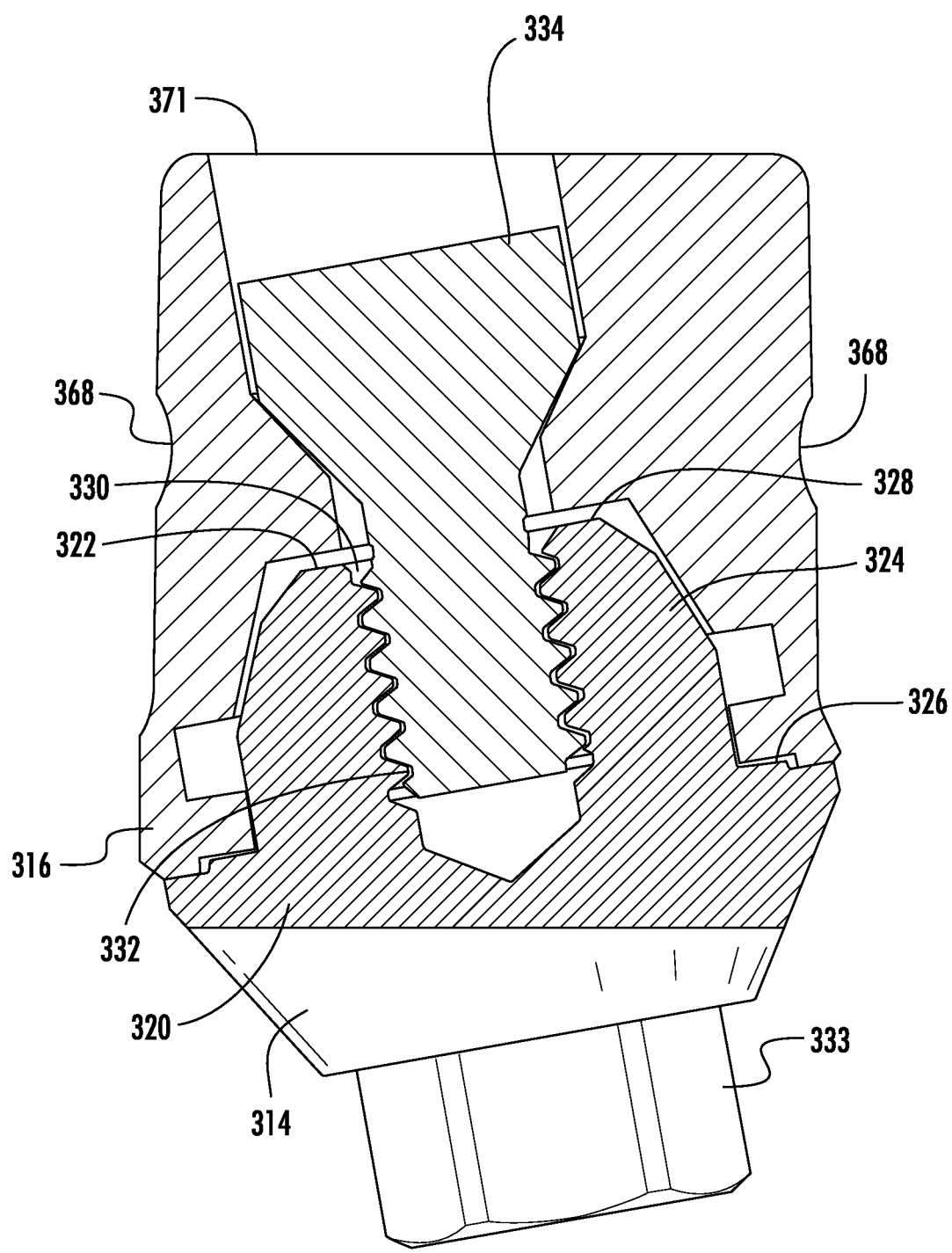
FIG. 19 is a cross-sectional view of the multi-component dental implant system taken along lines A-A of FIG. 18D, shown without the housing assembly.
Figure 20:
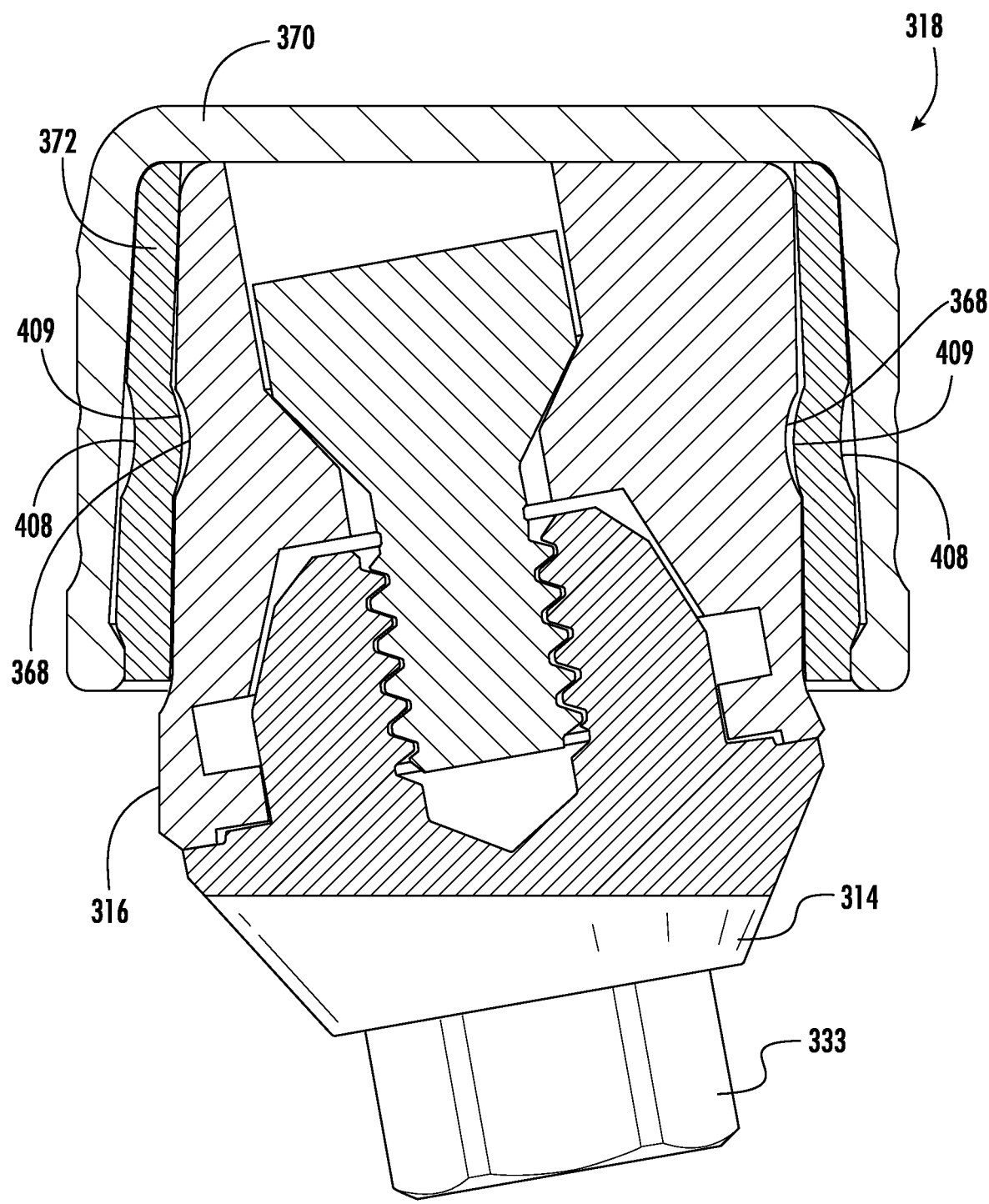
FIG. 20 is a cross-sectional view of the multi-component dental implant system illustrated in FIG. 19 with the housing assembly.
Figure 21A:
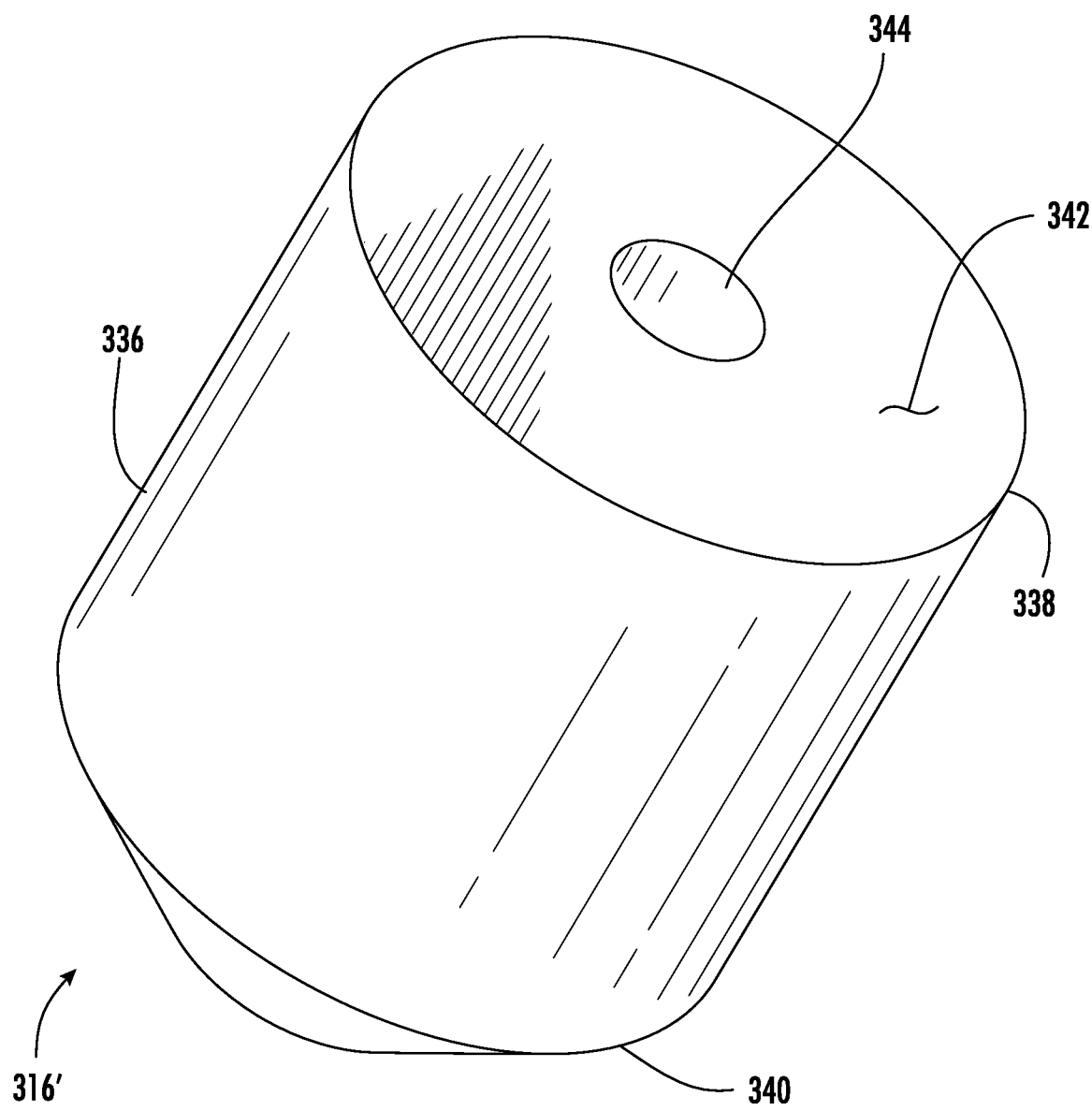
FIG. 21A is a right, top perspective view of an alternative embodiment of an illustrative example of the dental prosthesis engagement member in the form of a machining blank prior to custom milling of the final geometry of the dental prosthesis engagement member.
Figure 21B:
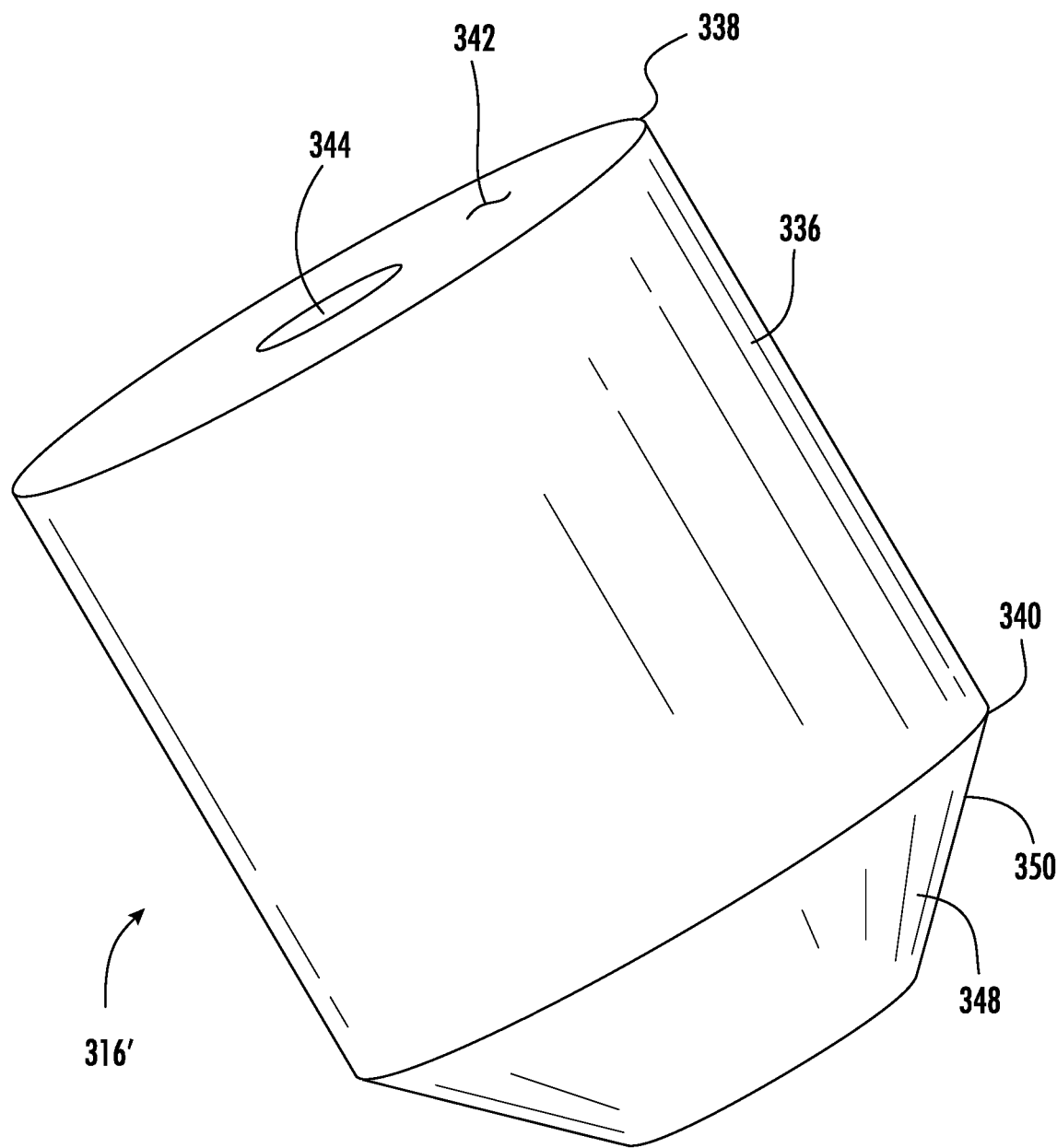
FIG. 21B is a left, top perspective view of the dental prosthesis engagement member illustrated in FIG. 21A.
Figure 21C:
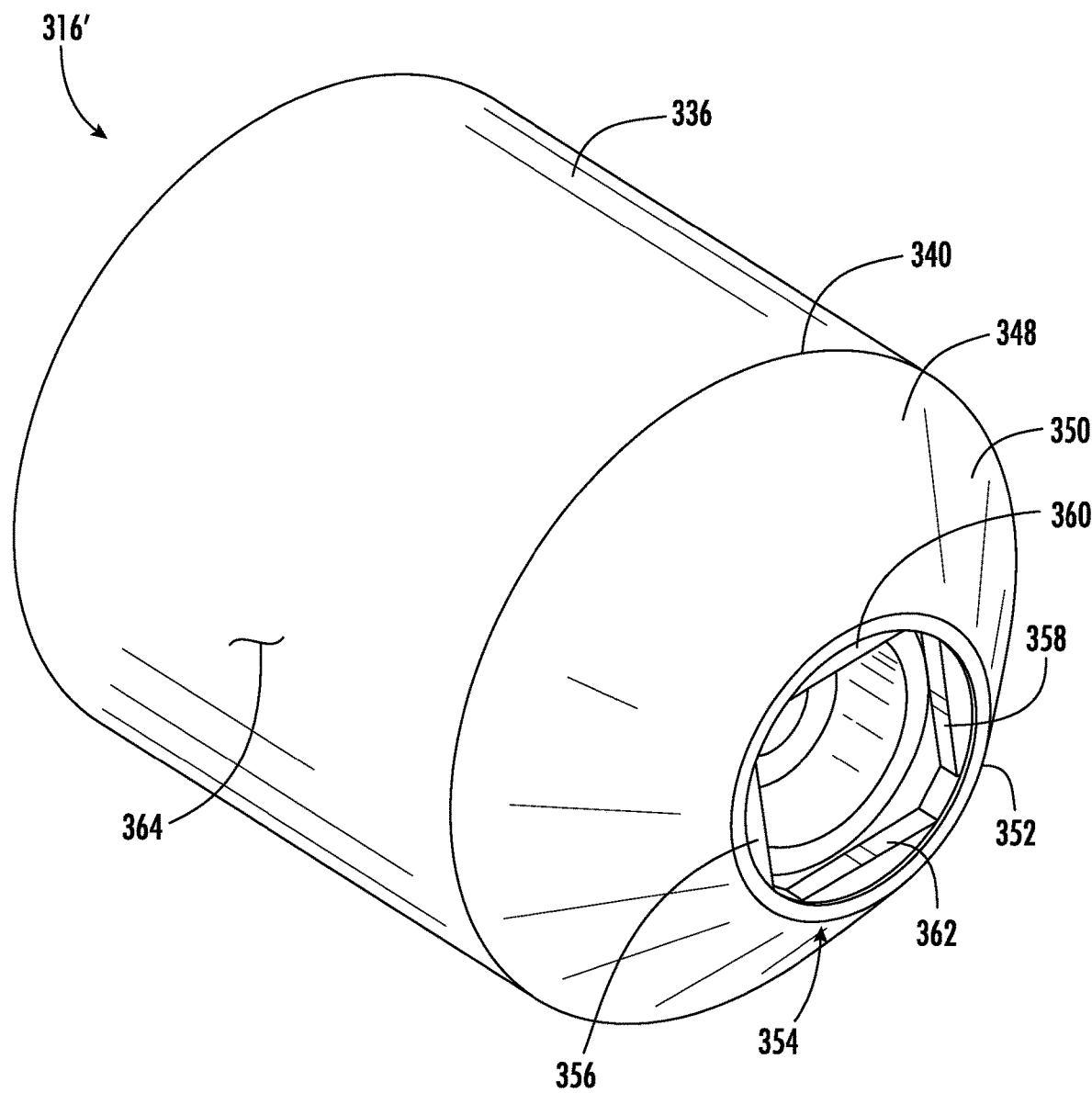
FIG. 21C is a right, bottom perspective view of the dental prosthesis engagement member illustrated in FIG. 21A.
Figure 21D:
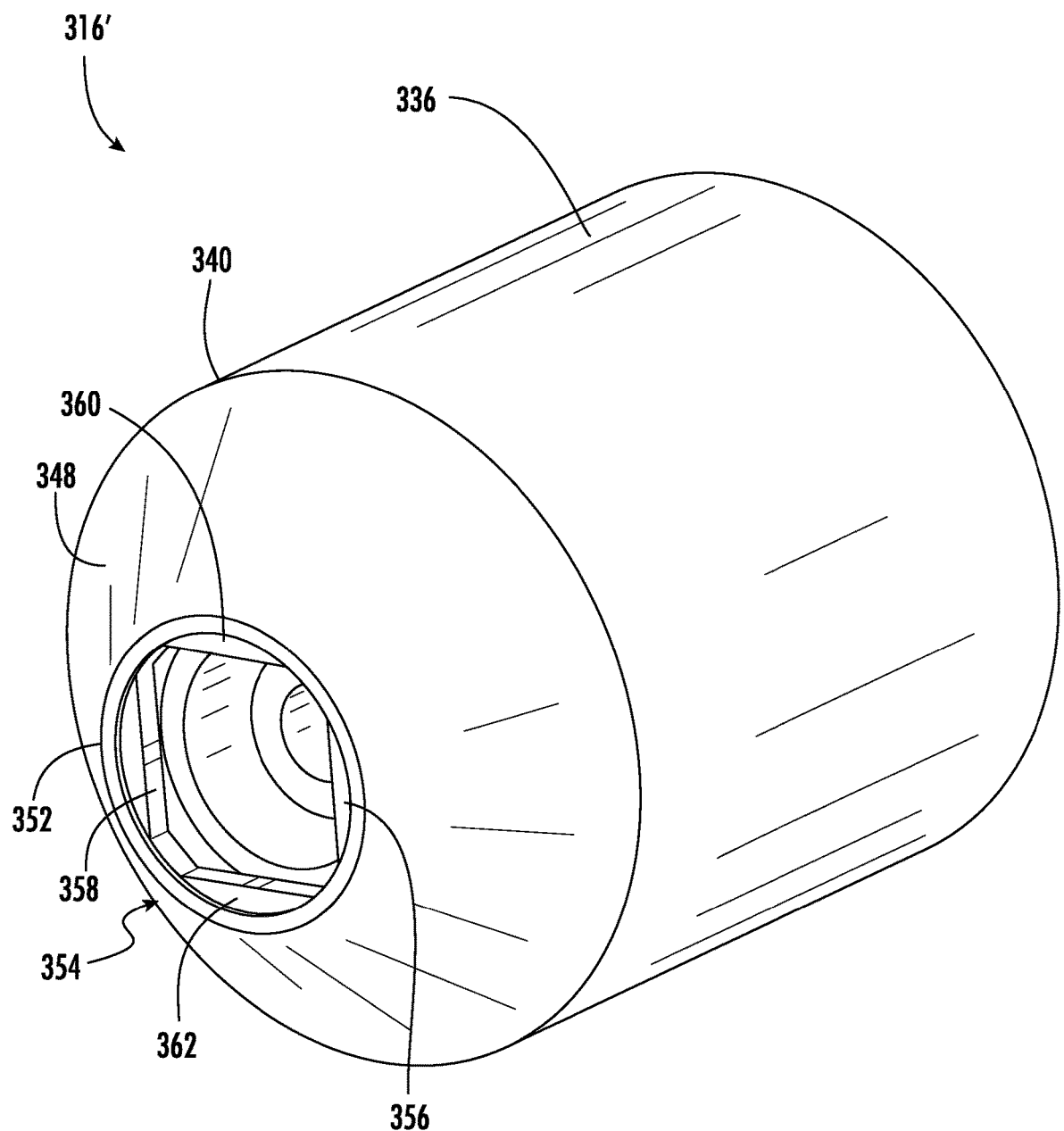
FIG. 21D is a left, bottom perspective view of the dental prosthesis engagement member illustrated in FIG. 21A.
Figure 21E:
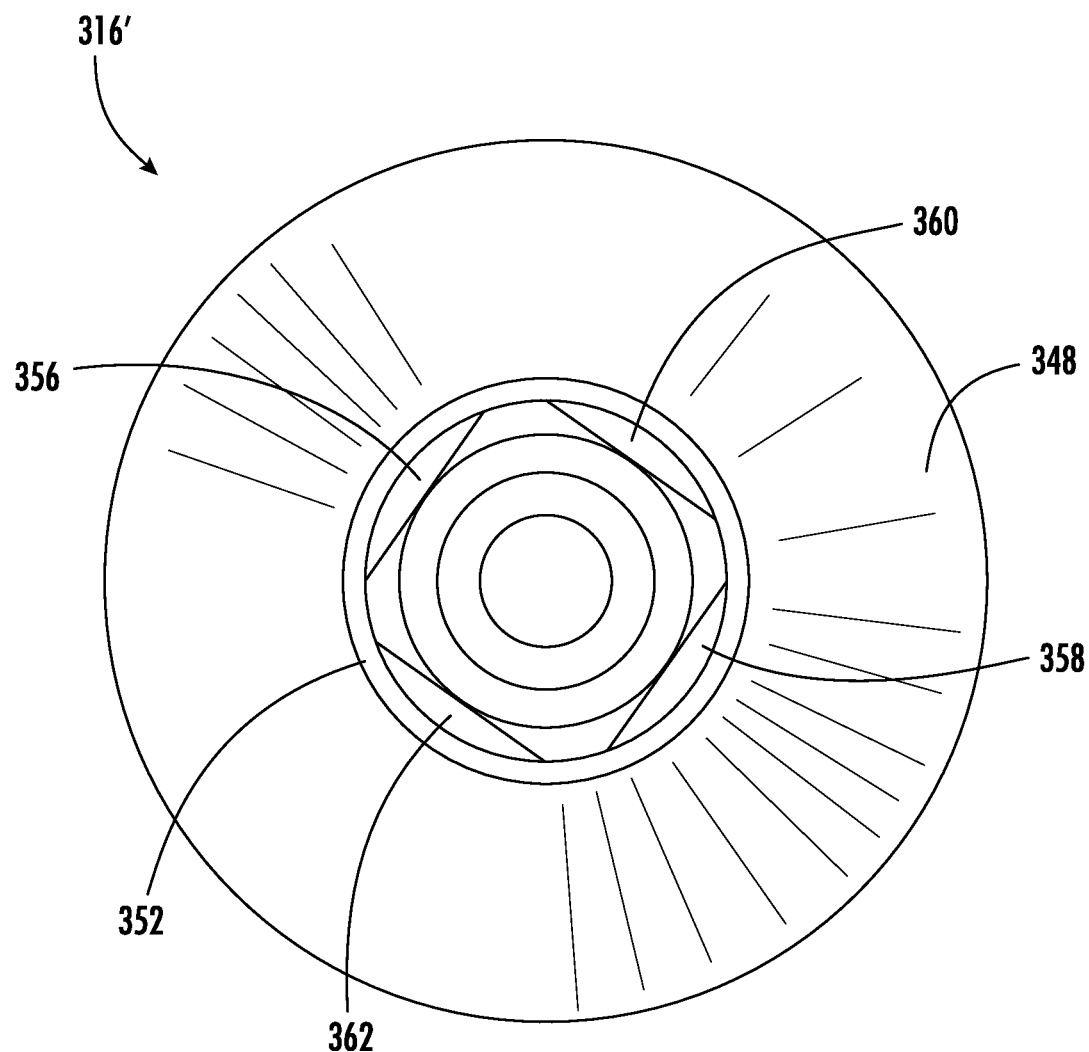
FIG. 21E is a bottom view of the dental prosthesis engagement member illustrated in FIG. 21A.

The outer surface 364 of the engagement member or coping main body 336 in the blank state is shown having a generally cylindrical shape with no surface configurations. In use, the outer surface 364 may be modified or milled to include surface configurations, such as flat or planar surfaces or sections 366 separated by curved or concave surfaces 368, (which is the same as the small depression or a concave circumferential donut shaped recess 126) which preferably extend around the circumference of the milled engagement member or coping main body 369, (FIG. 18E). The curved or concave surfaces 368 extend around the circumference of the milled engagement member or coping main body 369, thus forming an annular ring which provides surface retention by creating surface interface with a corresponding mating surface, such as the inner member of the housing unit 318. In addition to the modifications to the outer surface 364 of the engagement member or coping main body 336, the dental prosthesis engagement member or coping 316 may be modified to include a small tapering, such as 1 degree.

Similar to that described earlier, the primary or first abutment 314 and/or the dental prosthesis engagement member 316 are configured to provide for parallel orientation(s) of the central axis relative to other dental prosthesis engagement members 316 inserted within the jaw. Accordingly, the primary or first abutment 314 and/or the dental prosthesis engagement member 316 contain various tapering or angulation to accomplish such parallel orientations. Referring back to FIGS. 18C-18D, the dental implant system 300 is shown with the dental prosthesis engagement member or coping 316 (processed and milled) secured to the primary or first abutment 314. The dental prosthesis engagement member or coping 316 is illustrated having the curved or concave surfaces 368 extend around the circumference of the milled engagement member or coping main body 369. An opening 371 located on the upper surface 373 is sized and shaped to receive and hold the retaining screw 334, see FIG. 19. The opening 371 may be positioned at various orientations off center at various degrees from the upper surface 373 depending on the angulation correction of the cone of the dental prosthesis engagement member 316. Except where noted or illustrated, the primary or first abutment 314 comprises all the same features as described for the primary or first abutment 14. The first end 322 of the primary or first abutment 314 may contain a first end body 324 extending upwardly, away from an upper surface 326 of the main body 320, see FIG. 19. The first end body 324 may have an upper surface 328 having an opening 330 with threading 332 sized and shaped to receive and hold a retaining screw 334.

Figure 22:
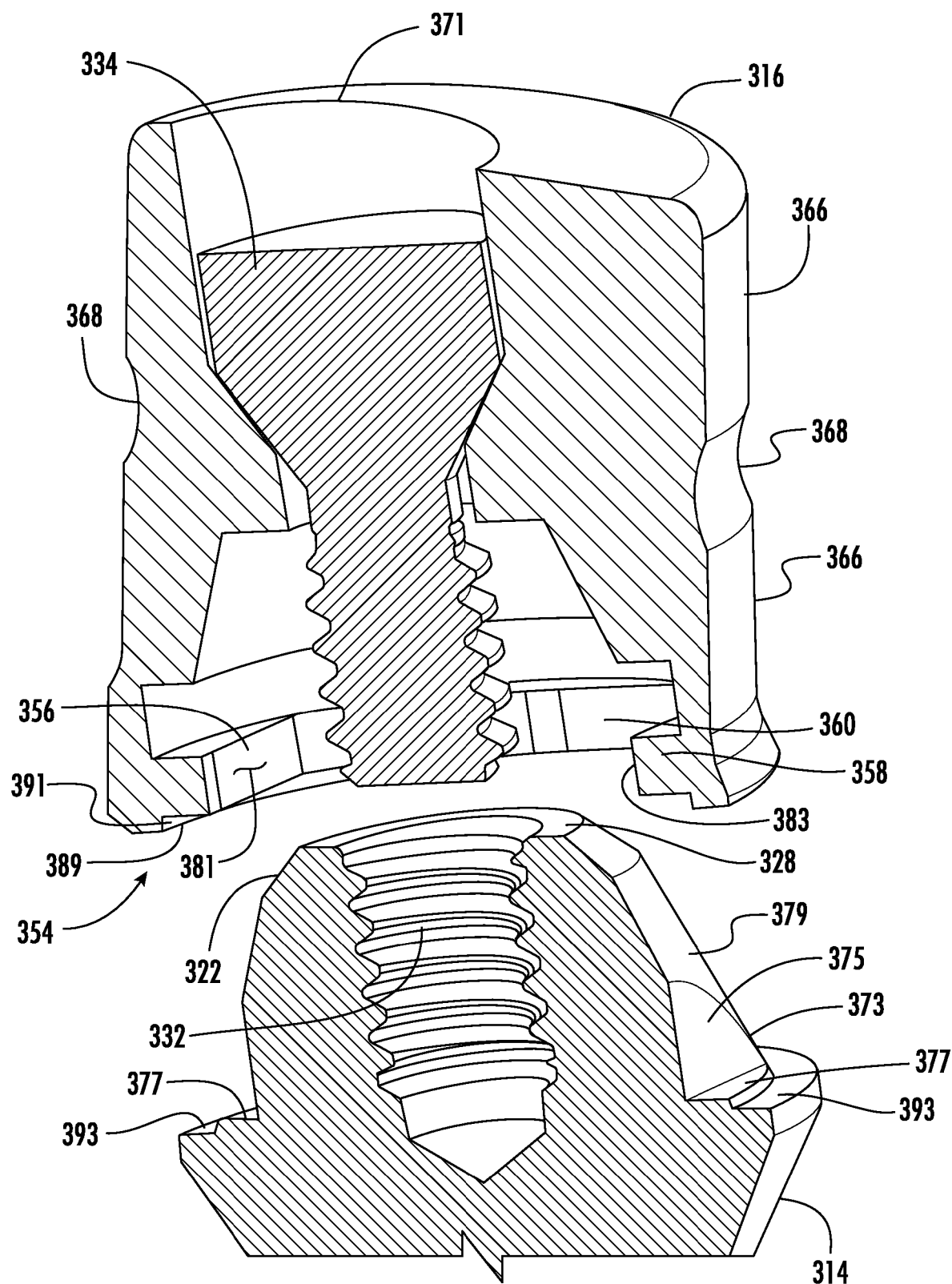
FIG. 22 illustrates a first stage of the engagement of the first abutment and the dental prosthesis engagement member.
Figure 23:
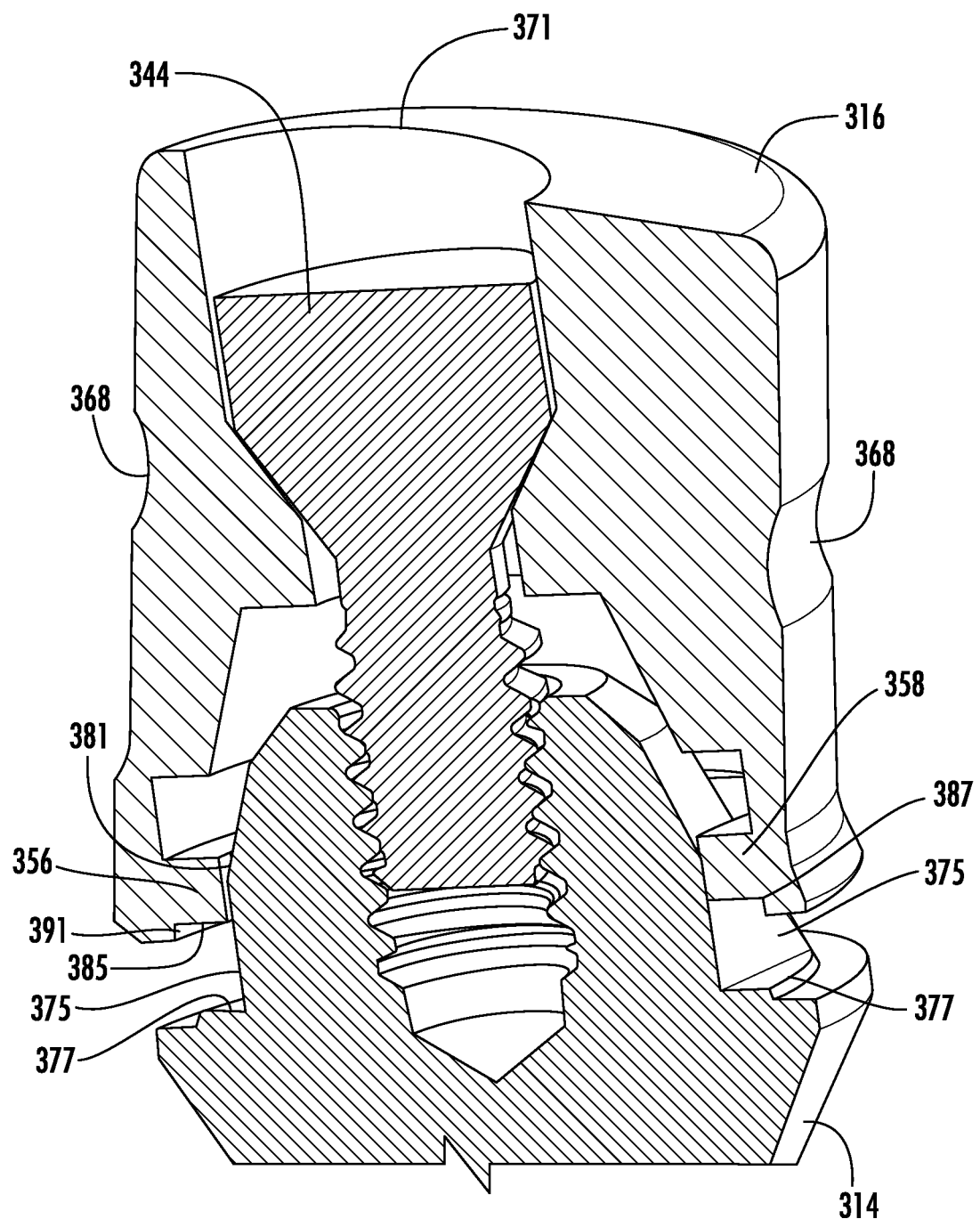
FIG. 23 illustrates a second stage of engagement of the first abutment and the dental prosthesis engagement member, illustrating the dental prosthesis engagement member just prior to being seated with the first abutment.
Figure 24:
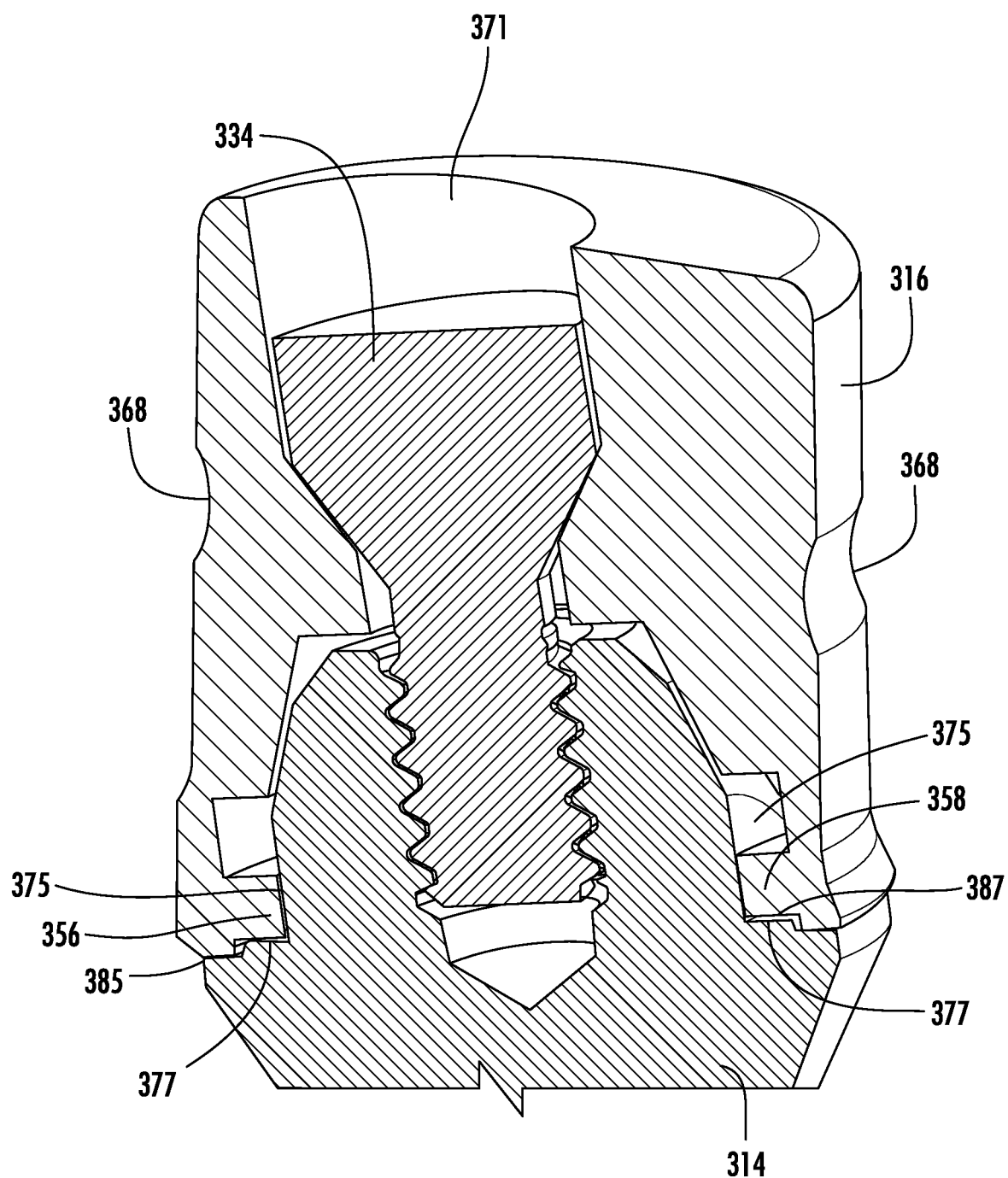
FIG. 24 illustrates the third stage of the engagement of the first abutment and the dental prosthesis engagement member, illustrating the dental prosthesis engagement member being seated with the first abutment.

Referring to FIGS. 22-24, various stages of engagement of the first abutment 314 and the dental prosthesis engagement member 316 are shown. In this embodiment, 1) the primary abutment 314 does not include a male clocking slot 84, and 2) the dental prosthesis engagement member 316 does not include a female clocking slot 54. Instead of the male-female keyed type clocking mechanism, the dental prosthesis engagement member 316 uses the abutment locking member 354 to key into a corresponding dental prosthesis engagement member locking member 373 associated with the first abutment 314. The first abutment dental prosthesis engagement member locking member 373 is illustrated herein as one or more flat surface(s) 375 terminating in a seat or ledge 377 within the tapered outer surface 379 arranged about the first abutment 314. The one or more flat surface 375 is sized and shaped to engage with the side surfaces of the first elongated surface 356, the second elongated surface 358, the third elongated surface 360, or the fourth elongated surface 362 of the abutment locking member 354. In the figures, the side surface 381 of the first elongated surface 356 and the side surface 383 of the second elongated surface 358 are shown engaging with the one or more flat surface(s) 375.

As the dental prosthesis engagement member or coping 316 is seated, the bottom surface 385 of the first elongated surface 356 is seated and rests on the one or more flat surface 375 seat or ledge 377 and the bottom surface 387 of the second elongated surface 358 is seated and rests on the one or more flat surface 375 seat or ledge 377. The first elongated surface 356, second elongated surface 358, third elongated surface 360, or fourth elongated surface are positioned inward from the bottom surface 389, thus providing an overhang, forming a rim or ridge 391. The ridge or rim 391 is positioned within a primary abutment seat 393.

Accordingly, the dental prosthesis engagement member 316 (16) may be custom made and configured to have a specific angle (via the base or at the base or via the cone) which will correspond to the orientation of other dental prosthesis engagement members 316. In a dental arch with four (4) dental implants, a patient may need varying degrees of correction to align in a prefect paralleled orientation. The dental implant system 300 may be configured so that the dental prosthesis engagement member 316 may be designed to have an angle correction of various angles, preferably between zero and fifteen degrees. As such, the dental implant system 300 may be configured so that the first dental prosthesis engagement member 316 has an angle correction of 2.45 degrees for the first implant body 12, a second dental prosthesis engagement member 316 may be designed to have an angle correction of 9.7 degrees for the second implant body 12, a third dental prosthesis engagement member 316 may be designed to have an angle correction of 11.2 degrees for a third implant body 12, and a fourth dental prosthesis engagement member 316 may be designed to have an angle correction of 5.5 degrees for a fourth implant body 12.

Figure 25:
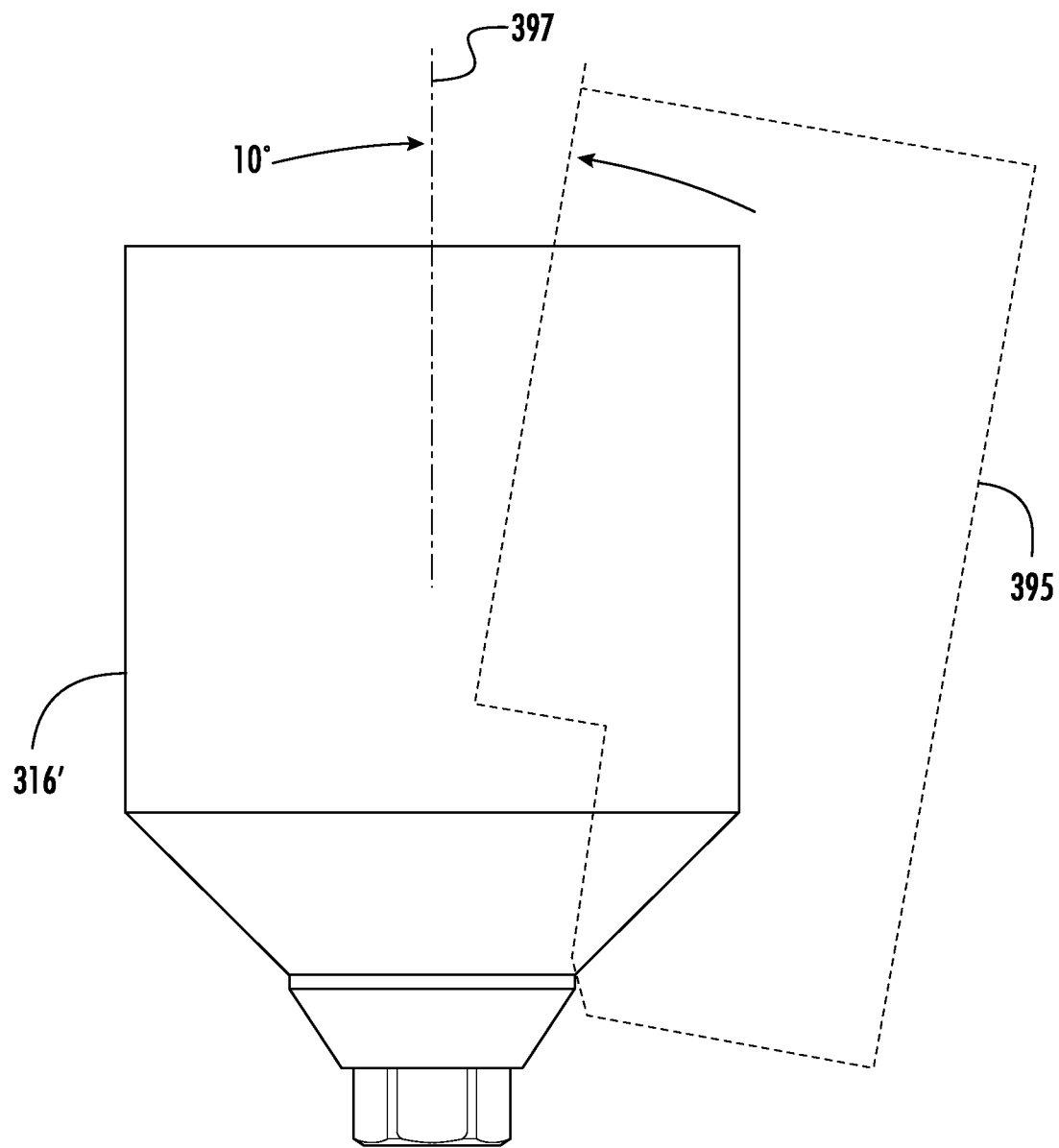
FIG. 25 illustrates the removal of portions of the dental prosthesis engagement member blank to form an angled cone.
Figure 26:
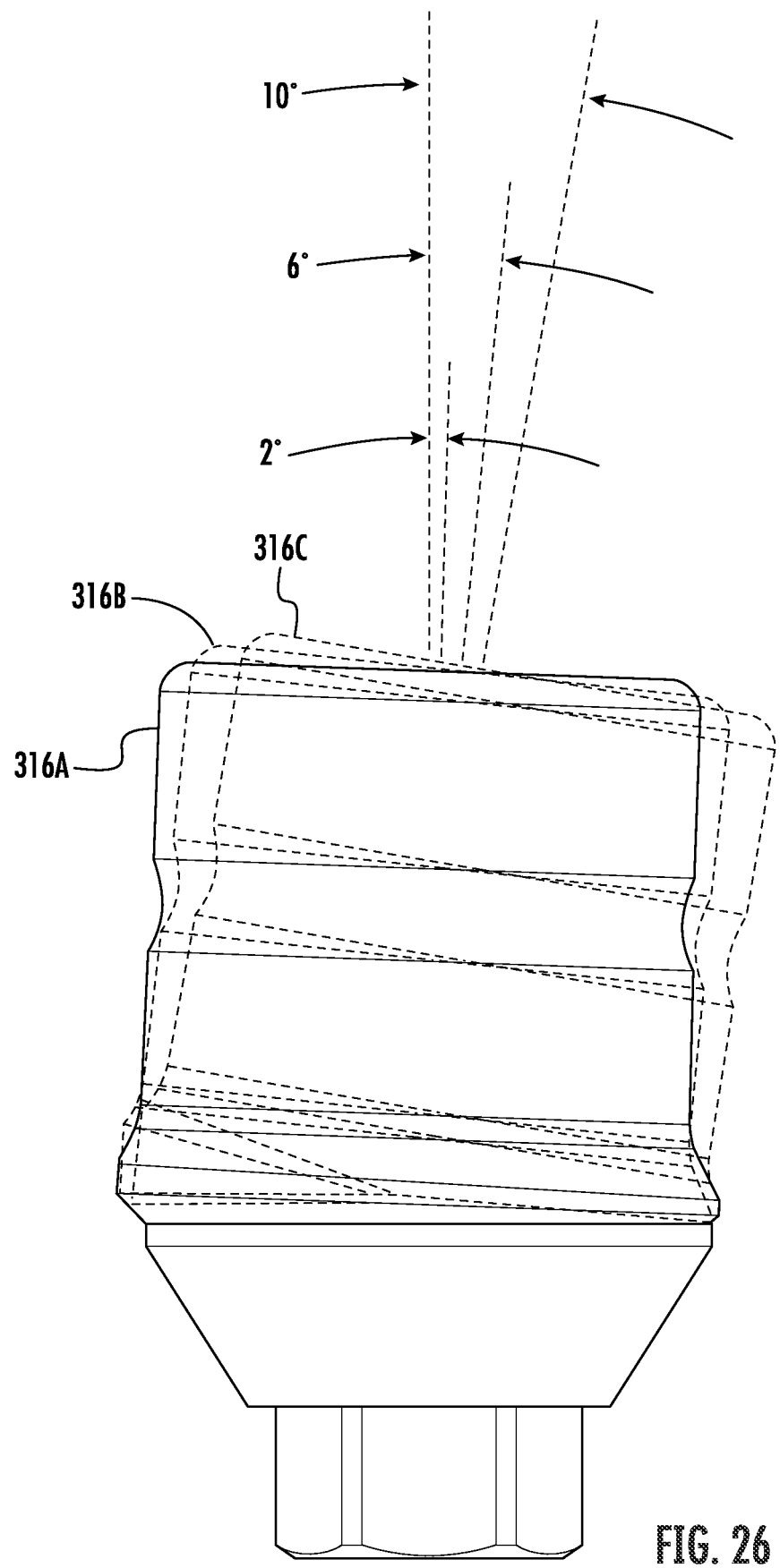
FIG. 26 illustrates the three dental prosthesis engagement members milled at three different angles.
Figure 27:
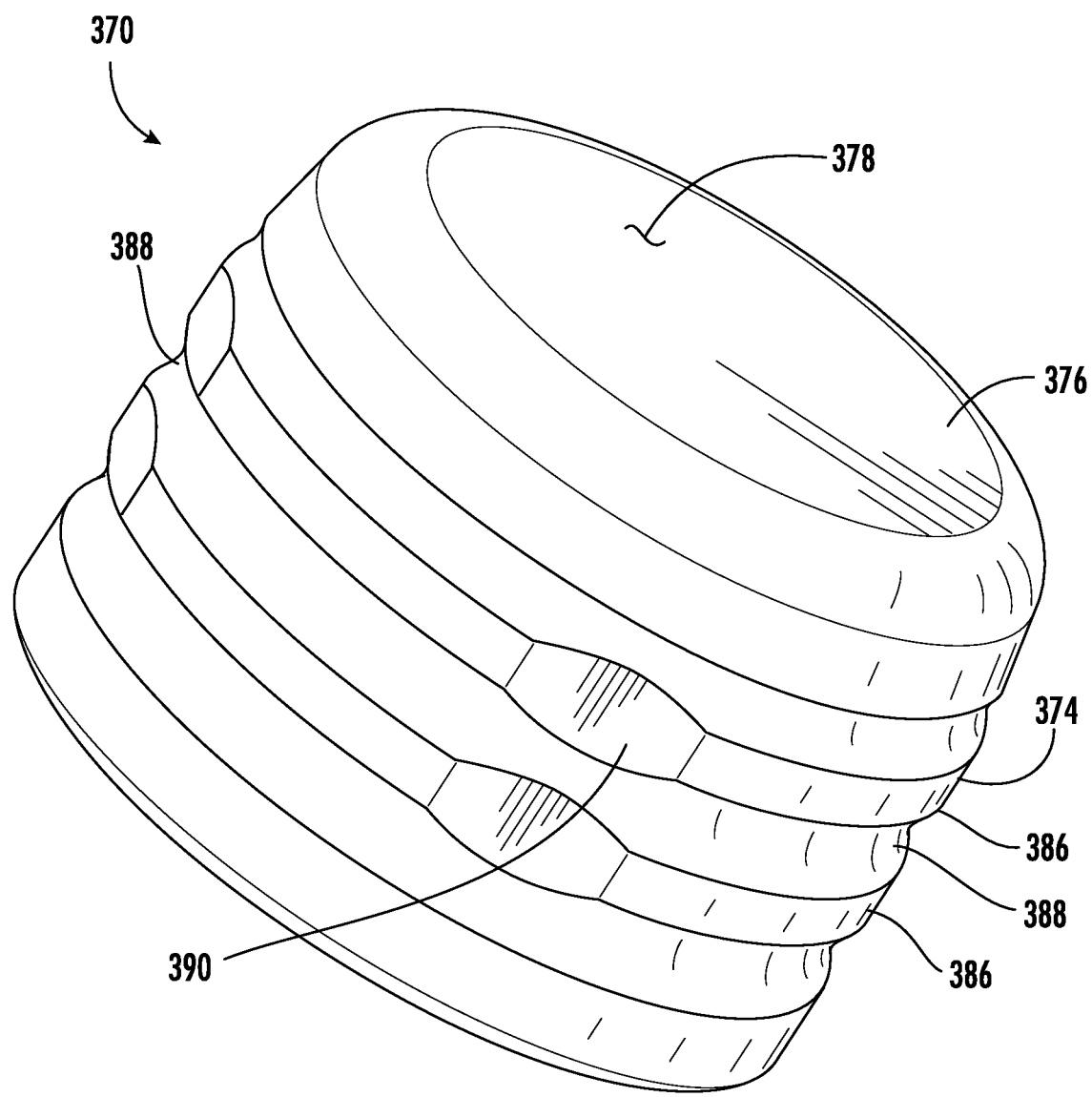
FIG. 27 is a right, top perspective view of an alternative embodiment of an illustrative example of the outer member of the housing assembly.
Figure 28:
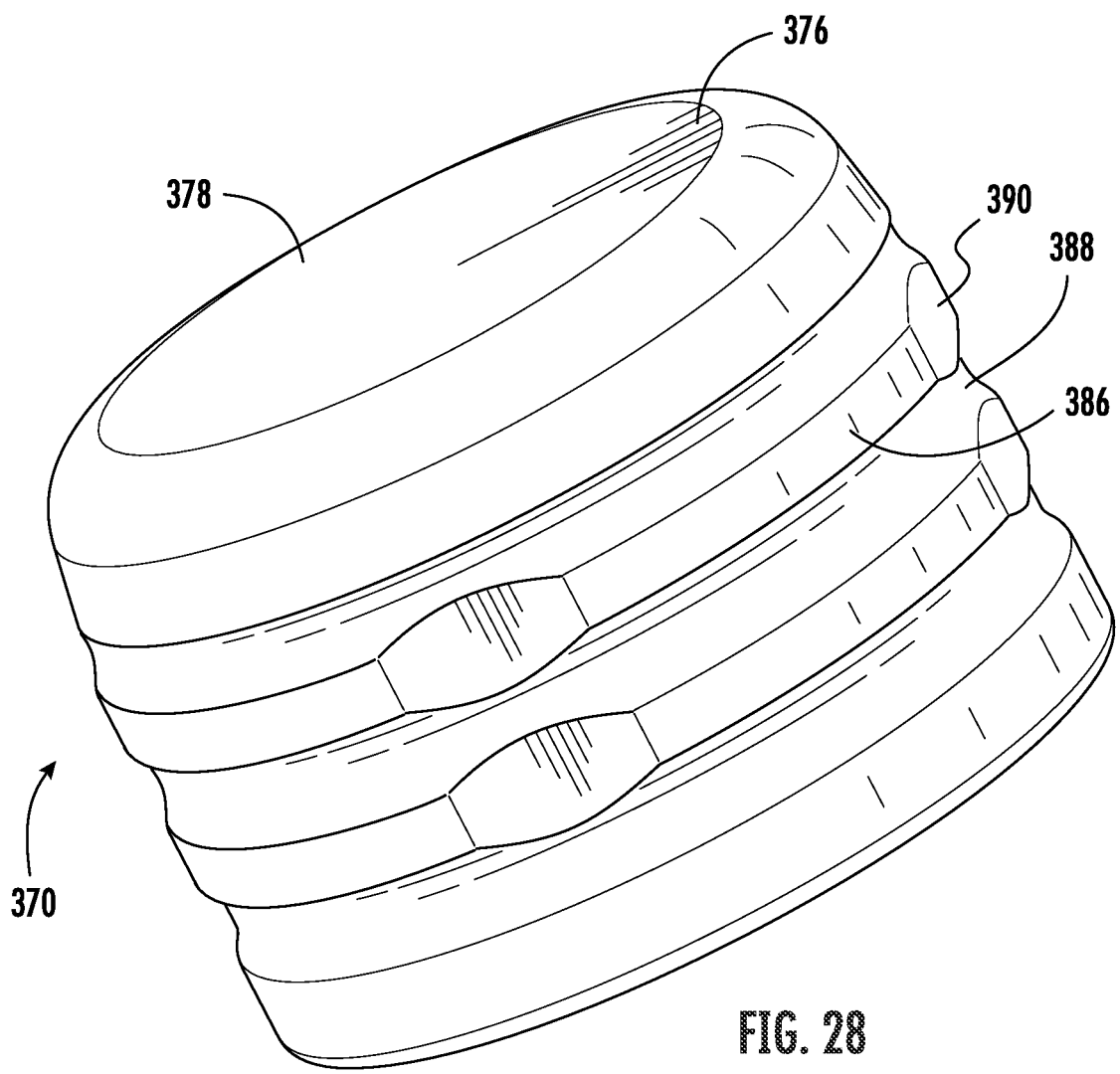
FIG. 28 is a left, top perspective view of the outer member of the housing assembly illustrated in FIG. 27.
Figure 29:
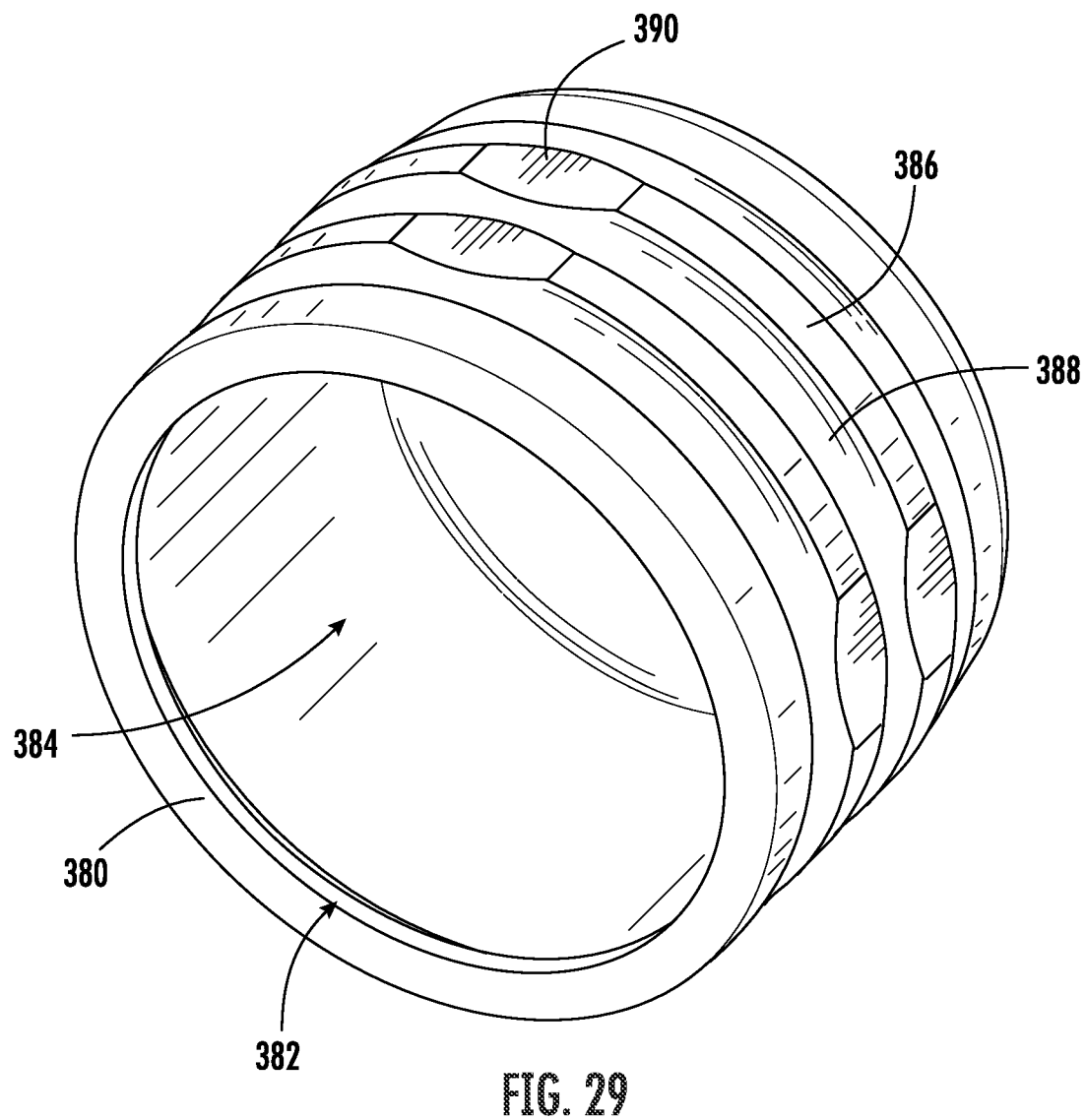
FIG. 29 is a left, bottom perspective view of the outer member of the housing assembly illustrated in FIG. 27.
Figure 30:
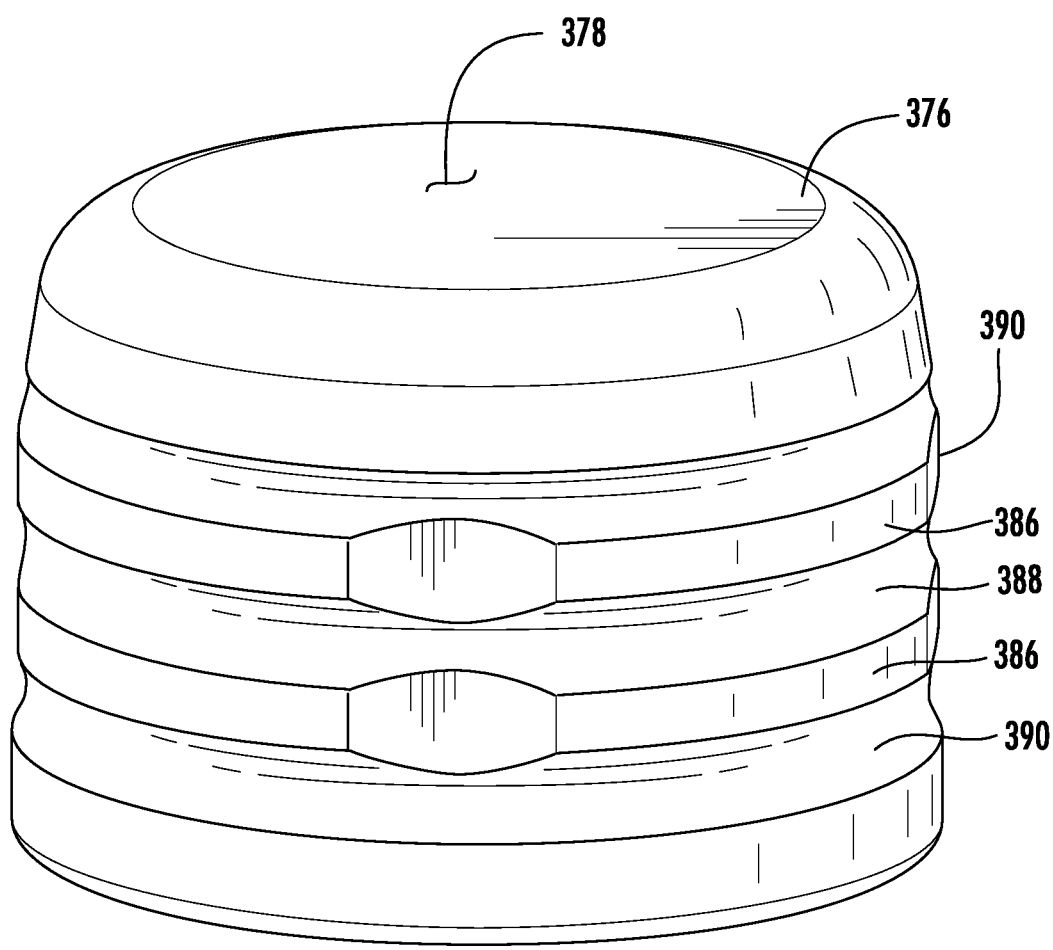
FIG. 30 is a perspective view of the outer member of the housing assembly illustrated in FIG. 27.
Figure 31:
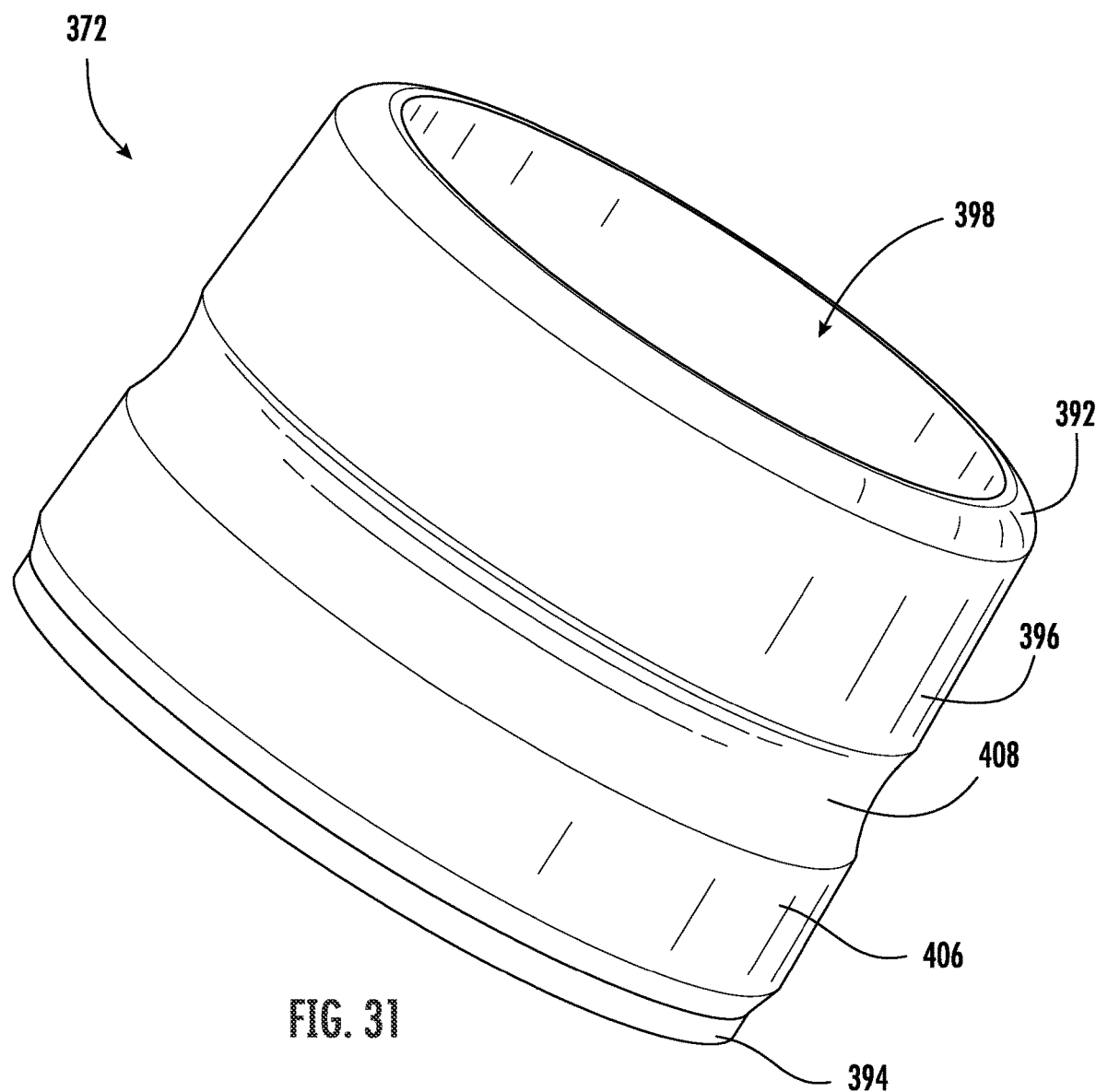
FIG. 31 is a right, top perspective view of an alternative embodiment of an illustrative example of the inner member of the housing assembly.
Figure 32:
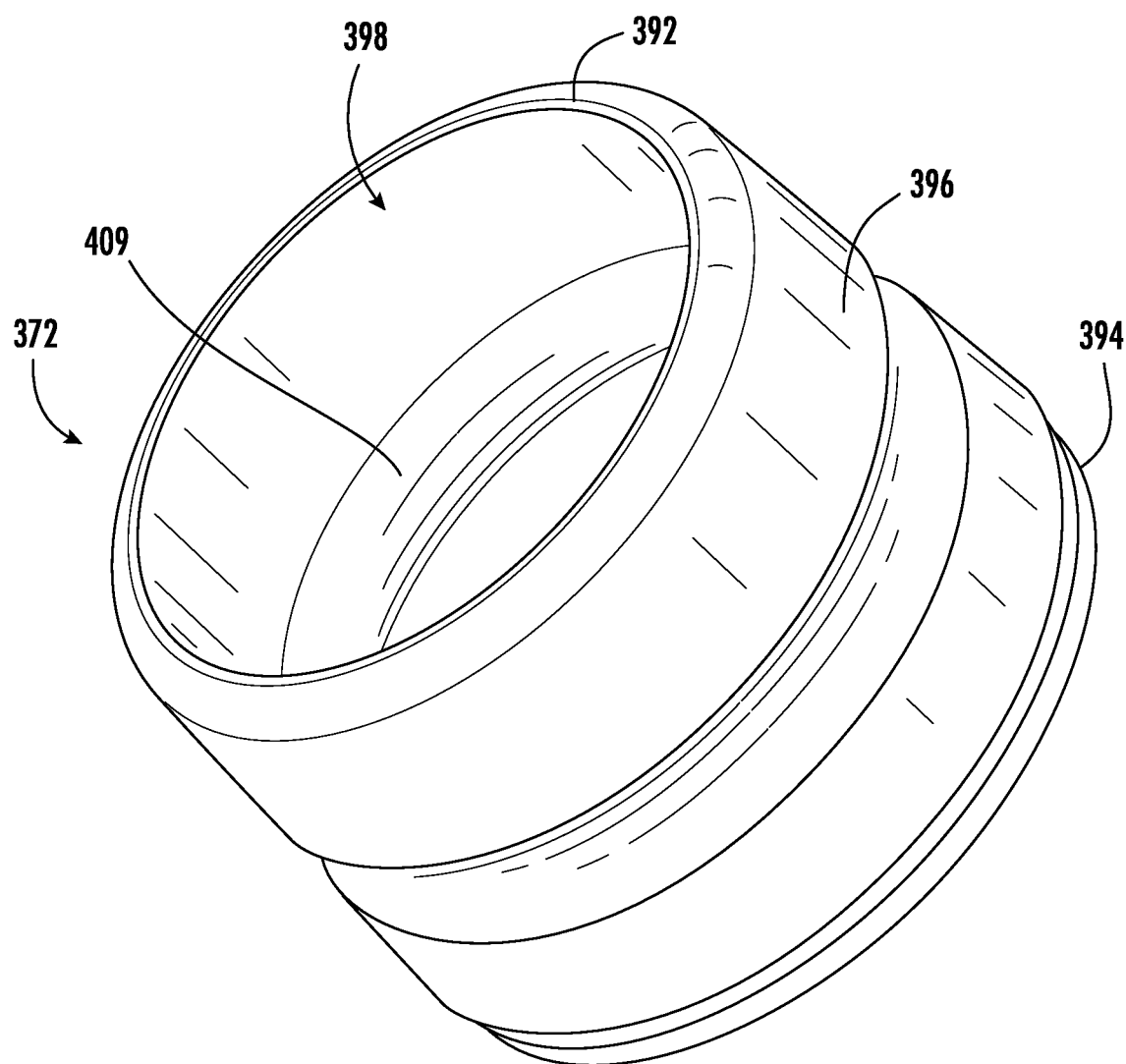
FIG. 32 is a left, top perspective view of the inner member of the housing assembly illustrated in FIG. 31.

The dental prosthesis engagement member or coping 316 may be milled either at the base (same as that depicted in FIG. 13A) or via the cone (see FIG. 26) to make the required angle correction to bring multiple implant assemblies within a patient's mouth into parallelism. Referring to FIG. 25, the dental prosthesis engagement member or coping 316 is shown being cut into the cone at an angle. The material removed is within the bounds of the bounded shape 395. The axis of rotation of the milled cut is the axis angled from vertical 397. In the case below, it is 10 degrees. Referring to FIG. 26, three dental prosthesis engagement members or copings 316 (milled) are illustrated at three different angles (overlaid). The figure illustrates angle correction of two degrees, 316A, six degrees, 316B, and ten degrees, 316C.

The actual shape or angle of dental prosthesis engagement member 316 may be computer aided design (CAD) and computer aided milling (CAM), or other means, such as sinter laser melting (SLM) or possible 3D printing technologies. Accordingly, the dental implant system 300 may therefore utilize one or more primary dental prosthesis engagement members 316 having the same degree angled surfaces (i.e. all with one-degree angles), one or more primary dental prosthesis engagement members 316 having different degree angled surfaces (i.e. one with a four-degree angle, one with a two-degree angle, one with a one-degree angle, one with a 0.5 degree angle, one with a 2.7 degree angle, one with a 13.25 degree angle, and one with a zero-degree angle), or combinations thereof. As a result, a dental practitioner using the dental implant system 300 provides implants in which each of the individual implants are arranged in a more parallel orientation. As the dental implants 312 are fixed in the jawbone at the angle required by the user's anatomy, the use of different angulation (typically 0, 17, 30 degrees) first abutments 314 allows the resulting orientation of the connection to a more parallel state (parallel with respect to all other implant 312 connection orientations). The milled dental prosthesis engagement member surfaces 366 and 368 and the resulting axis of the dental prosthesis engagement member cone brings the connection orientation of the mating component within the prosthesis to parallel with all other mating components within the prosthesis, allowing the prosthesis to seat fully and completely. The advantage of the dental implant system 300 provides components, when placed in the user's mouth, which are parallel in orientation in relation to each other.

Similar to housing assembly 18, the housing assembly 318 is configured to secure to the dental prosthesis engagement member 316 along one surface, and to a dental prosthesis, such as a denture 109, along a second, independent surface. The housing assembly 318 comprises an outer member 370 and an inner member 372. Referring to FIGS. 27-30, an alternative embodiment of the outer member 370 of the housing assembly 318 is illustrated. The outer member 370 is preferably made of a rigid material, such as titanium. The outer member 370 comprises a main body 374 having a closed upper end 376 having an upper surface 378 and a second open end 380. Opening 382 exposes the inner portion 384. The outer member 370 may include one or more mechanical retention members, such as ribbing 386. The ribbing 386 may by separated by a concaved or recessed area 388 which preferably runs along the circumference of the outer member 370. The ribbing(s) 386 has generally rounded surfaces, having one or more flat surfaces 390 around the circumference of the ribbing 386, acting as an anti-rotational feature (prevent spinning in the prosthesis/denture).

Figure 33:
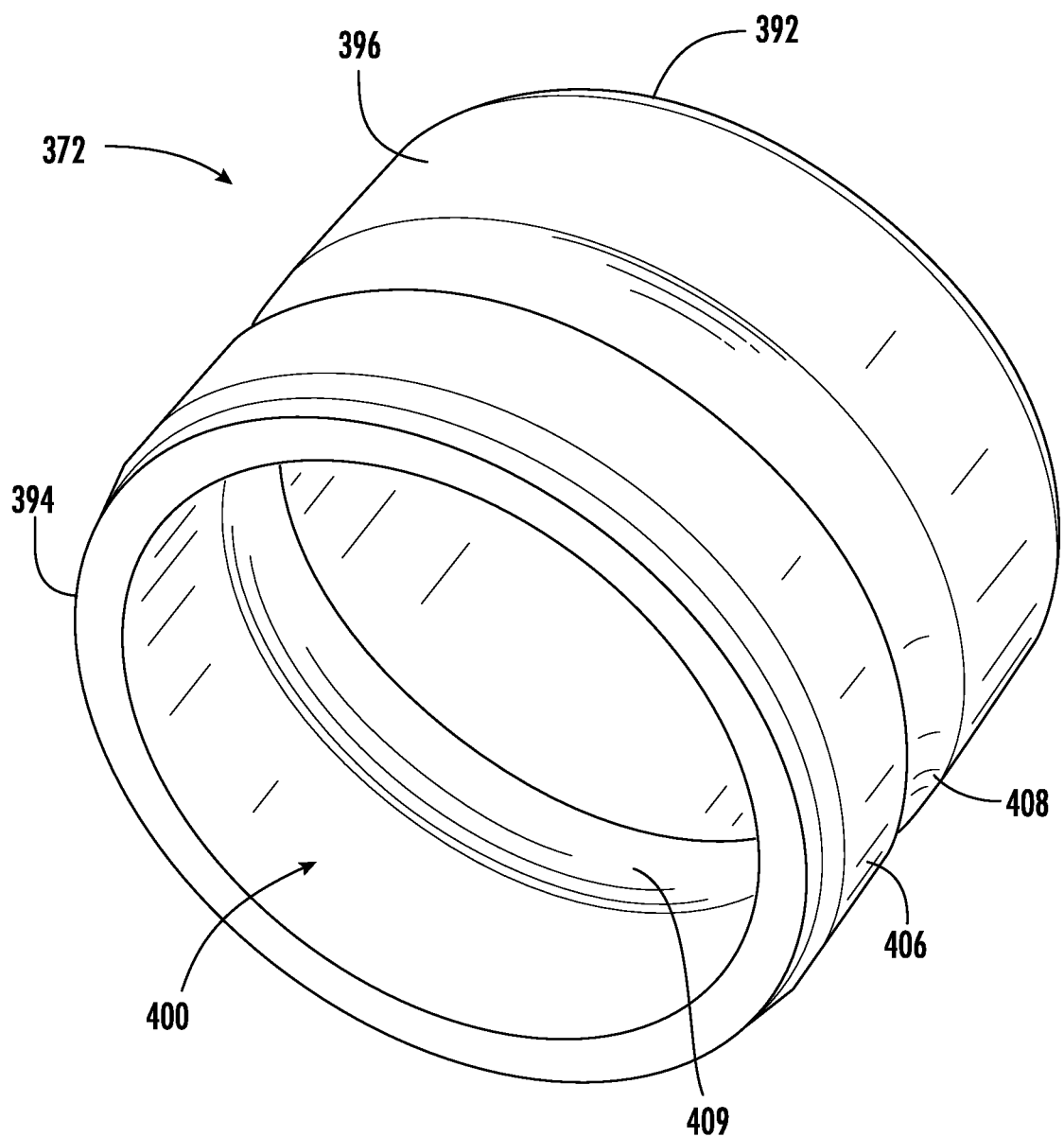
FIG. 33 is a right, bottom perspective view of the inner member of the housing assembly illustrated in FIG. 31.
Figure 34:
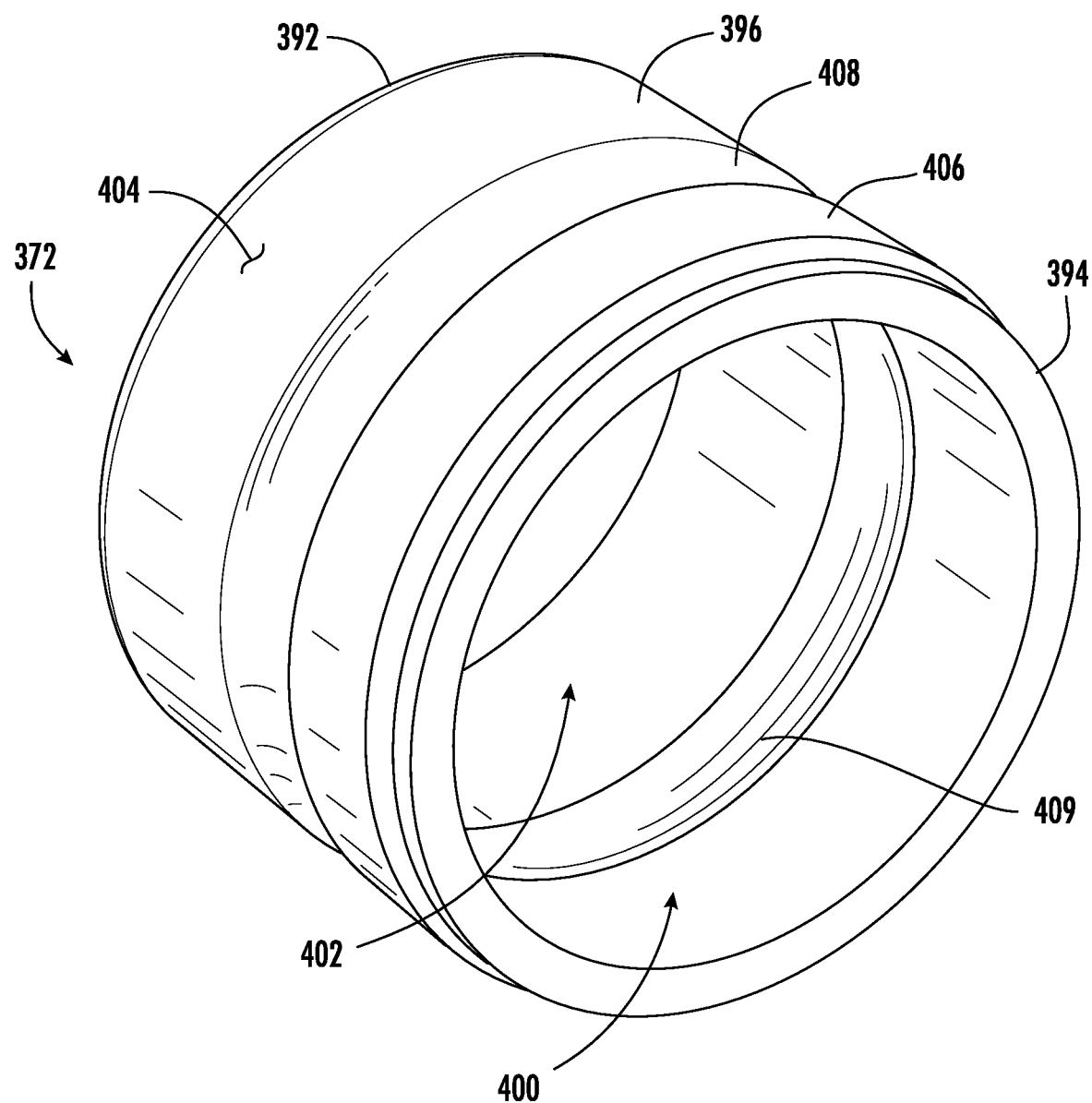
FIG. 34 is a left, bottom perspective view of the inner member of the housing assembly illustrated in FIG. 31.
Figure 35:
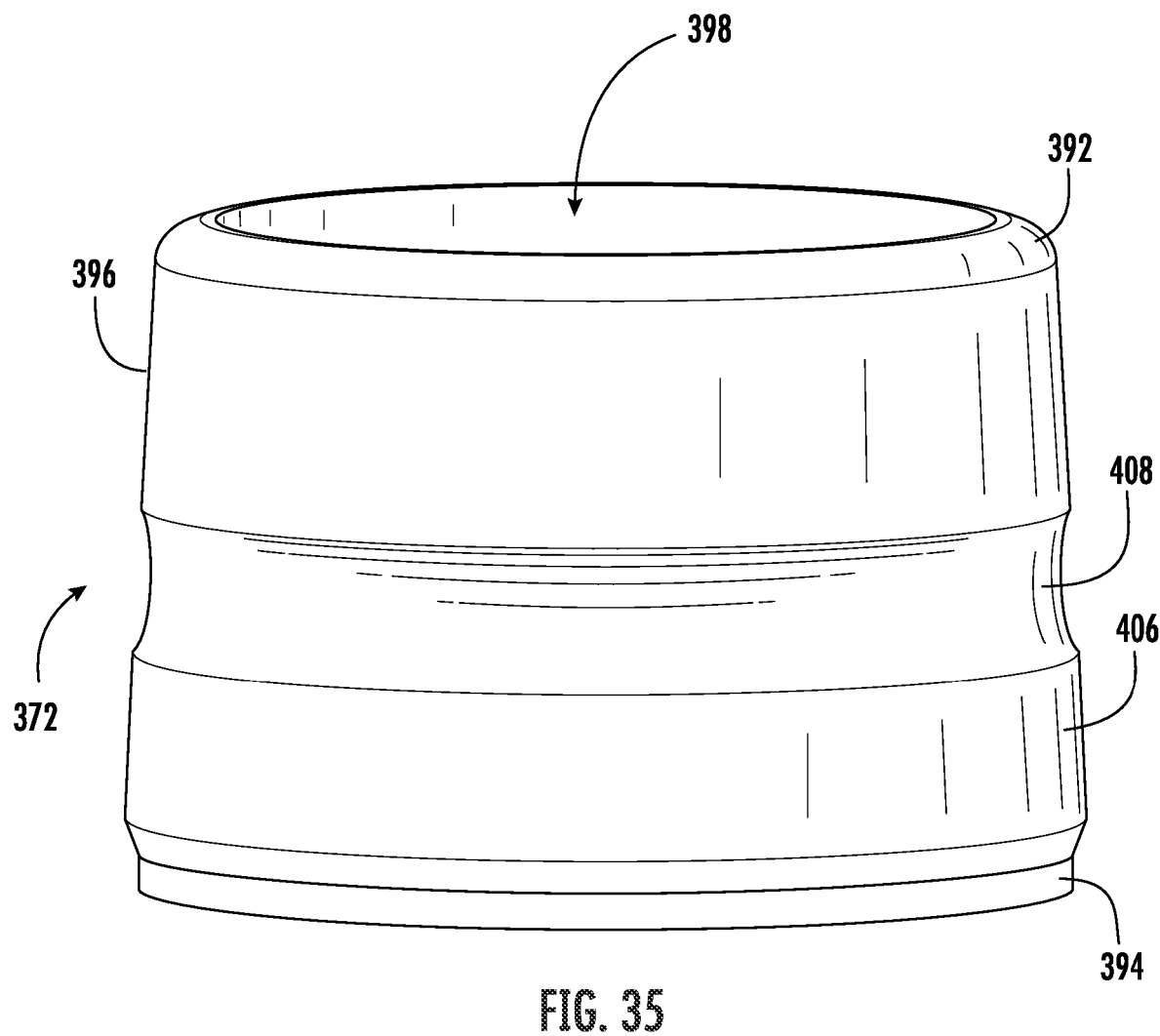
FIG. 35 is a perspective view of the inner member of the housing assembly illustrated in FIG. 31.

The inner member 372, which may be referred to as a retention sleeve, preferably is a flexible nylon retention sleeve, or other retention type material (such as polyetheretherketone (PEEK) or polymer material), which is designed to fit onto and secure to the outer surface 364 of the dental prosthesis engagement member or coping 316. The inner member 372 is designed to snap or friction fit within the outer member 370, creating friction between the dental prosthesis (i.e. denture 190) and the custom designed dental prosthesis engagement member or coping 316. The inner member 372 comprises a top end 392, a bottom end 394, and a main body 396 separating the top end 392 and the bottom end 394. The top end 392 is open and includes a first opening 398. The bottom end 394 is open as well, and includes a second opening 400. The interior area 402 is sized and shaped to engage with at least a portion of the dental prosthesis engagement member or coping 316. The outer surface 404 of the retention sleeve main body 396 may include one or more mechanical retention members, such as ribbing 406. The ribbing 406 may by separated by a concaved or recessed area 408, which preferably runs along the circumference of the nylon inner member/retention sleeve 372. The interior part of the inner member 372 may include a convex feature or a protuberance or bump 409, see FIGS. 19, 33 and 34, which is sized and shaped to engage or interact with the curved or concave surfaces 368 of the dental prosthesis engagement member or coping 316, thus securing the two structures together. The nylon inner member/retention sleeve 372 may be made of different retention strengths.

The open nature of the inner member 372 may provide a benefit in which the prosthesis attached thereto has a metal on metal contact, with the top of the outer member 370 contacting the top of the dental prosthesis engagement member or coping 316 without an intervening layer from the inner member 372.

All patents and publications mentioned in this specification are indicative of the levels of those skilled in the art to which the invention pertains.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A dental implant system comprising:
   a first abutment, a coping member, a coping threaded screw and a housing assembly; the first abutment comprising a body constructed and arranged to be secured to the coping member at a first end and to a dental implant at a second end, said body comprising a taper-shaped portion having an outer surface comprising one or more locking members, said one or more locking members defined by a flat surface cut within said taper-shaped portion outer surface and terminating in a seat at a base, said first end comprising internal threading sized and shaped to receive the coping threaded screw, thereby securing said coping member to said first abutment, said body having a first longitudinal axis intersecting a second longitudinal axis at an angle of between zero degrees and less than forty-five degrees;

said coping member comprising a longitudinal axis, a custom milled main body having a base and a cone, an opening located on an upper surface, and an interior screw channel, said opening of said coping member sized and shaped to receive said coping threaded screw and is positioned on-center or off-center at various degrees depending on an angulation correction of said coping member, said interior screw channel sized and shaped to receive and hold said coping threaded screw, said interior screw channel terminating in a first abutment receiving portion, said first abutment receiving portion sized and shaped to receive said first abutment taper-shaped portion, said coping member comprising internal geometry at a base which is sized and shaped to engage with said at least one or more locking members flat surfaces of said first abutment taper-shaped portion, thus providing an anti-rotational mechanism when said first abutment is engaged with or secured to said coping member, said coping member providing angular correction relative to an orientation of one or more adjacent dental implants or one or more teeth at said base or said cone of between zero and fifteen degrees, said angular correction of between zero and fifteen degrees is determined by the angle between said coping member longitudinal axis and a vertical axis across said implant system, to align in a parallel orientation with said one or more additional implants or said one or more teeth; and said housing assembly constructed and arranged to secure to said coping member through engagement with a housing assembly inner member, and to a dental prosthesis through engagement with a housing assembly outer member, said housing assembly outer member comprising a closed first end defining a first end upper surface and a first end bottom surface, a second open bottom end, a body separating said closed first end and said second open end by a length, an interior sized and shaped to receive and engage with said housing assembly inner member, and a lip or shoulder configured to engage with a corresponding portion of said housing assembly inner member, thereby securing said housing assembly inner member to said housing assembly outer member, said housing assembly inner member comprising a first open end, a second open end, a body separating said first open end and said second open end by a length and an interior sized and shaped to receive and engage with said coping member, said housing assembly inner member body length extends from said bottom end of said housing assembly outer member to said first end of said housing assembly outer member, abutting said bottom surface of said housing assembly outer member body closed first end, wherein, when said housing assembly inner member and said housing assembly outer member are seated together, said first end of said housing assembly inner member directly interfaces with said housing assembly outer member closed first end and a second end of said housing assembly inner member engages with said housing assembly outer member open second end, wherein, when seated with said coping member, a top surface of said coping member directly interfaces with said first end bottom surface of said outer housing assembly member, said housing assembly inner member further comprising a circumferential male ring that interlinks with a circumferential groove located on an exterior surface of said coping member.

2. The dental implant system according to claim 1, further including a dental implant body configured to be insertable and securable into an anatomical structure of an individual's mouth, said dental implant body comprising a first end configured to secure to said first abutment, an opposing second end implantable to said anatomical structure of an individual's mouth, and an elongated body separating said first end and said second end.

3. The dental implant system according to claim 1, wherein said first longitudinal axis and said second longitudinal axis intersecting angle is zero degrees, seventeen degrees, or thirty degrees.

4. The dental implant system according to claim 1, wherein said coping member includes a collar defining a bottom edge.

5. The dental implant system according to claim 4, wherein said collar has an angled bottom end surface of between zero and fifteen degrees.

6. The dental implant system according to claim 1, wherein said housing assembly inner member and said housing assembly outer member are secured together via frictional fit.

7. The dental implant system according to claim 1, wherein said housing assembly inner member is a retention sleeve made of a flexible material.

8. The implant system according to claim 1, further including a dental prosthesis.

9. A dental implant system comprising:
a first implant unit comprising a first abutment, a first coping member, a first coping threaded screw and a first housing assembly; the first abutment comprising a body constructed and arranged to be secured to the first coping member at a first end and to a first dental implant at a second end, said body comprising a taper-shaped portion having an outer surface comprising one or more flat surfaces at a base, said first end comprising internal threading sized and shaped to receive the first coping threaded screw, thereby securing said first coping member to said first abutment, said body having a first longitudinal axis intersecting a second longitudinal axis at an angle of between zero degrees and less than forty-five degrees; said first coping member comprising a longitudinal axis, a custom milled main body having a base, a cone, and an interior, said interior having a screw channel sized and shaped to receive said first coping threaded screw, said screw channel terminating in a first abutment receiving portion, said first abutment receiving portion sized and shaped to receive said first abutment taper-shaped portion, said first coping member comprising internal geometry at a base which is sized and shaped to engage with said at least one or more flat surfaces of said first abutment taper-shaped portion, thus providing an anti-rotational mechanism when said first abutment is engaged with or secured to said first coping member, said first coping member providing angular correction relative to an orientation of one or more adjacent dental implants or one or more teeth at said base or said cone of between zero degrees and fifteen degrees, said angular correction of between zero and fifteen degrees determined by an angle between said coping member longitudinal axis and a vertical axis across said implant unit, thereby creating an angled first coping member having degrees of correction of between zero and fifteen degrees; and said first housing assembly constructed and arranged to secure to said first coping member through engagement with a first housing assembly inner member, and to a dental prosthesis through engagement with a first housing assembly outer member, said first housing assembly outer member comprising a closed first end defining a first end upper surface and a first end bottom surface, a second open bottom end, a body separating said closed first end and said second open end by a length, an interior sized and shaped to receive and engage with said first housing assembly inner member, and a lip or shoulder configured to engage with a corresponding portion of said first housing assembly inner member, thereby securing said first housing assembly inner member to said first housing assembly outer member, said first housing assembly inner member comprising a first open end, a second open end, a body separating said first open end and said second open end by a length and an interior sized and shaped to receive and engage with said coping member, said housing assembly inner member body length extends from said bottom end of said housing assembly outer member to said first end of said housing assembly outer member, abutting said bottom surface of said housing assembly outer member body closed first end, wherein, when said housing assembly inner member and said housing assembly outer member are seated together, said first end of said housing assembly inner member directly interfaces with said housing assembly outer member closed first end and a second end of said housing assembly inner member engages with said housing assembly outer member open second end, wherein, when seated with said first coping member, a top surface of said first coping member directly interfaces with said first end bottom surface of said first outer housing assembly member, said first housing assembly inner member further comprising a circumferential male ring that interlinks with a circumferential groove located on an exterior surface of said first coping member; and a second implant unit comprising a second abutment, a second coping member, a second coping threaded screw and a second housing assembly; the second abutment comprising a body constructed and arranged to be secured to the second coping member at a first end and to a second dental implant at a second end, said body comprising a taper-shaped portion having an outer surface comprising one or more flat surfaces at a base, said first end comprising internal threading sized and shaped to receive the second coping threaded screw, thereby securing said second coping member to said second abutment, said body having a first longitudinal axis intersecting a second longitudinal axis at an angle of between zero degrees and less than forty-five degrees; said second coping member comprising a longitudinal axis, a custom milled main body having a base, a cone, and an interior, said interior having a screw channel sized and shaped to receive said second coping threaded screw, said screw channel terminating in a first abutment receiving portion, said first abutment receiving portion sized and shaped to receive said second abutment taper-shaped portion, said second coping member comprising internal geometry at a base which is sized and shaped to engage with said at least one or more flat surfaces of said second abutment taper-shaped portion, thus providing an anti-rotational mechanism when said second abutment is engaged with or secured to said second coping member, said second coping member providing angular correction relative to an orientation of one or more adjacent dental implants or one or more teeth at said base or said cone of between zero degrees and fifteen degrees, said angular correction of between zero and fifteen degrees determined by an angle between said coping member longitudinal axis and a vertical axis across said implant unit, thereby creating an angled second coping member having degrees of correction of between zero and fifteen degrees; and said second housing assembly constructed and arranged to secure to said second coping member through engagement with a second housing assembly inner member, and to a dental prosthesis through engagement with a second housing assembly outer member, said second housing assembly outer member comprising a closed first end defining a first end upper surface and a first end bottom surface, a second open bottom end, a body separating said closed first end and said second open end by a length, an interior sized and shaped to receive and engage with said second housing assembly inner member, and a lip or shoulder configured to engage with a corresponding portion of said second housing assembly inner member, thereby securing said second housing assembly inner member to said second housing assembly outer member, said second housing assembly inner member comprising a first open end, a second open end, a body separating said first open end and said second open end by a length and an interior sized and shaped to receive and engage with said coping member, said housing assembly inner member body length extends from said bottom end of said housing assembly outer member to said first end of said housing assembly outer member, abutting said bottom surface of said housing assembly outer member body closed first end, wherein, when said housing assembly inner member and said housing assembly outer member are seated together, said first end of said housing assembly inner member directly interfaces with said housing assembly outer member closed first end and a second end of said housing assembly inner member engages with said housing assembly outer member open second end, wherein, when seated with said second coping member, a top surface of said second coping member directly interfaces with said first end bottom surface of said second housing assembly outer member, said second housing assembly inner member further comprising a circumferential male ring that interlinks with a circumferential groove located on an exterior surface of said second coping member;

wherein said first implant unit is orientated in a parallel position relative to said second implant unit.

10. The dental implant system according to claim 9, comprising a first dental implant and a second dental implant.

11. The dental implant system according to claim 9, comprising a dental prosthesis.

12. The dental implant system according to claim 1, wherein said housing assembly outer member is made of titanium and said housing assembly inner member is made of nylon.

13. The dental implant system according to claim 9, wherein said first housing assembly outer member is made of titanium, said housing assembly inner member is made of nylon, said second housing assembly outer member is made of titanium and said second housing assembly inner member is made of nylon.

\* \* \* \* \*